United States Patent [19]
Fujita et al.

[11] Patent Number: 5,659,402
[45] Date of Patent: Aug. 19, 1997

[54] IMAGE PROCESSING METHOD AND APPARATUS

[75] Inventors: Hiroyuki Fujita; Ariyoshi Hikosaka; Tetsuji Kajitani; Hidemitsu Hirano; Takuji Okumura; Tsukasa Matsushita, all of Osaka; Hideo Azumai, Toyonaka; Satoshi Iwatsubo, Osaka, all of Japan

[73] Assignee: Mita Industrial Co., Ltd., Osaka, Japan

[21] Appl. No.: 367,846

[22] Filed: Jan. 3, 1995

[30] Foreign Application Priority Data

Jan. 14, 1994 [JP] Japan .................... 6-002830
Jan. 14, 1994 [JP] Japan .................... 6-002832

[51] Int. Cl.$^6$ ........................................ H04N 1/40
[52] U.S. Cl. .................. 358/467; 358/462; 358/466; 358/448
[58] Field of Search .................... 358/462, 453, 358/464, 465, 466, 467, 455, 470, 448; 382/194, 170, 224, 227, 294, 295

[56] References Cited

U.S. PATENT DOCUMENTS

| | | | |
|---|---|---|---|
| 4,996,603 | 2/1991 | Kanemitsu | 358/462 |
| 4,999,629 | 3/1991 | Katsuta | 358/462 |
| 5,001,576 | 3/1991 | Tanaka et al. | 358/462 |
| 5,001,767 | 3/1991 | Yoneda et al. | 358/462 |
| 5,121,446 | 6/1992 | Yamada | 382/50 |
| 5,278,919 | 1/1994 | Sugiura | 358/462 |
| 5,381,241 | 1/1995 | Kawanaka | 358/462 |
| 5,448,656 | 9/1995 | Tanaka | 382/252 |
| 5,488,673 | 1/1996 | Katayama | 382/270 |
| 5,523,861 | 6/1996 | Tanaka | 358/475 |

FOREIGN PATENT DOCUMENTS

| | | | |
|---|---|---|---|
| 074795 | 3/1983 | European Pat. Off. | H04N 1/40 |
| 264205 | 8/1993 | United Kingdom | G06F 15/70 |

OTHER PUBLICATIONS

Patent Abstracts of Japan for Publication No. JP63114462.
Patent Abstracts of Japan for Publication No. JP5075850.
Patent Abstracts of Japan for Publication No. JP3208184.
Patent Abstracts of Japan for Publication No. JP1170270.

*Primary Examiner*—Edward L. Coles, Sr.
*Assistant Examiner*—Madeleine A.V. Nguyen
*Attorney, Agent, or Firm*—Beveridge, DeGrandi, Weilacher & Young, LLP

[57] ABSTRACT

In accordance with the present invention, a quadratic differential values is first calculated, based on differences in the density data between an object pixel and respective peripheral pixels around the object pixel. The square value SS of the quadratic differential value S and the sum ΣSS obtained by adding up the square values SS of quadratic differential values for continuous five pixels are employed as determination values (step n1). The square sum ΣSS is compared with respective threshold values a, b and d, and the square value SS is compared with respective threshold values c, e and f (steps n2 to n6 and n8). Based on these comparison results, it is judged which image area among a character image area, gray-scale image area and dotted image area the object pixel belongs to. As for the image area judgement concerning the dotted image area, the final judgement that the object pixel belongs to the dotted image area is made only when nine continuous pixels including the object pixel are all judged to belong to the dotted image area. Since the square values SS and square sum ΣSS take only a positive value, the threshold values are set only in a positive range, and hence the image processing can be simplified. Further, by employing the square sum ΣSS, the states of the peripheral pixels can be taken into consideration for the image area judgement.

4 Claims, 12 Drawing Sheets

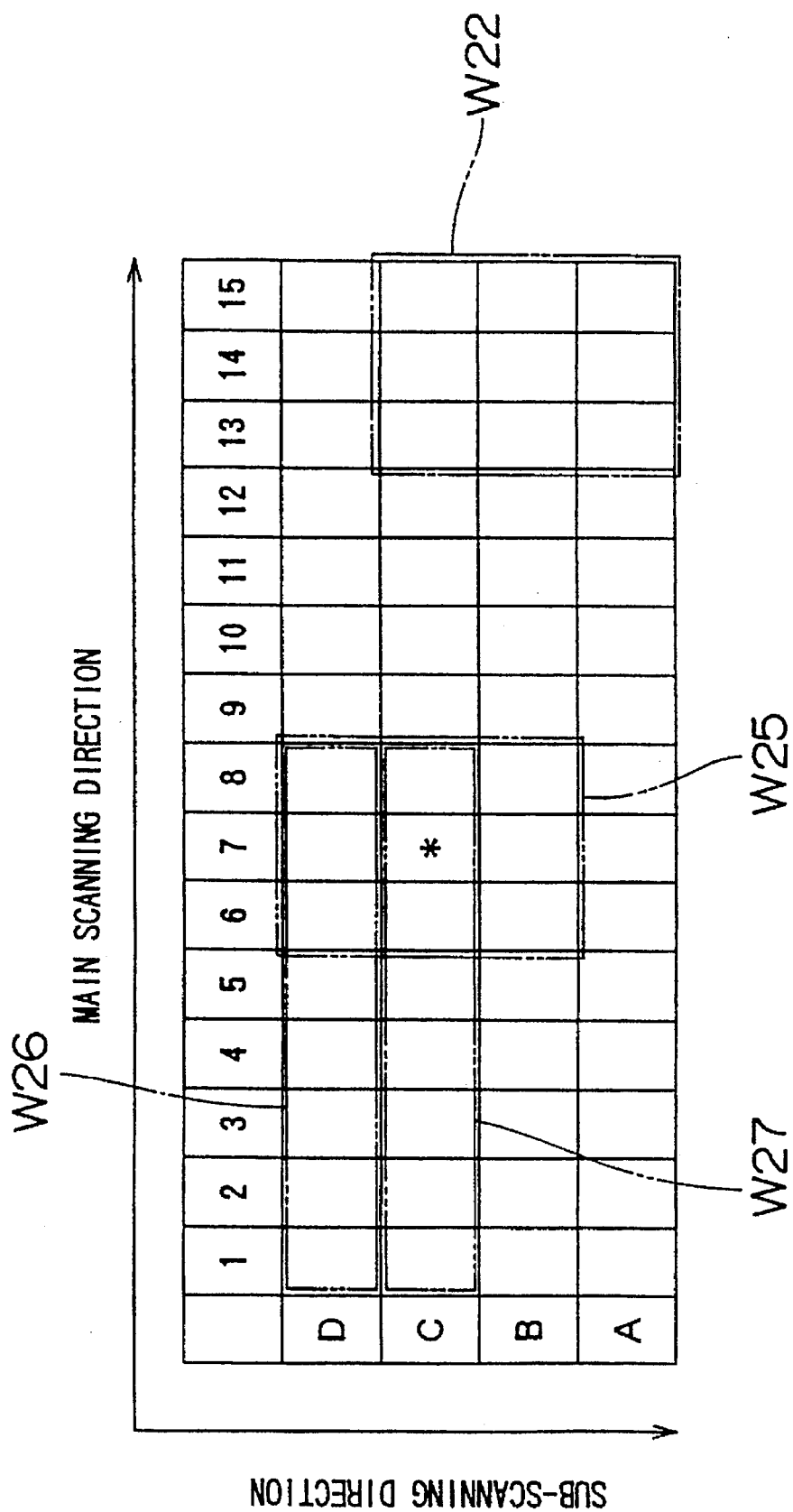

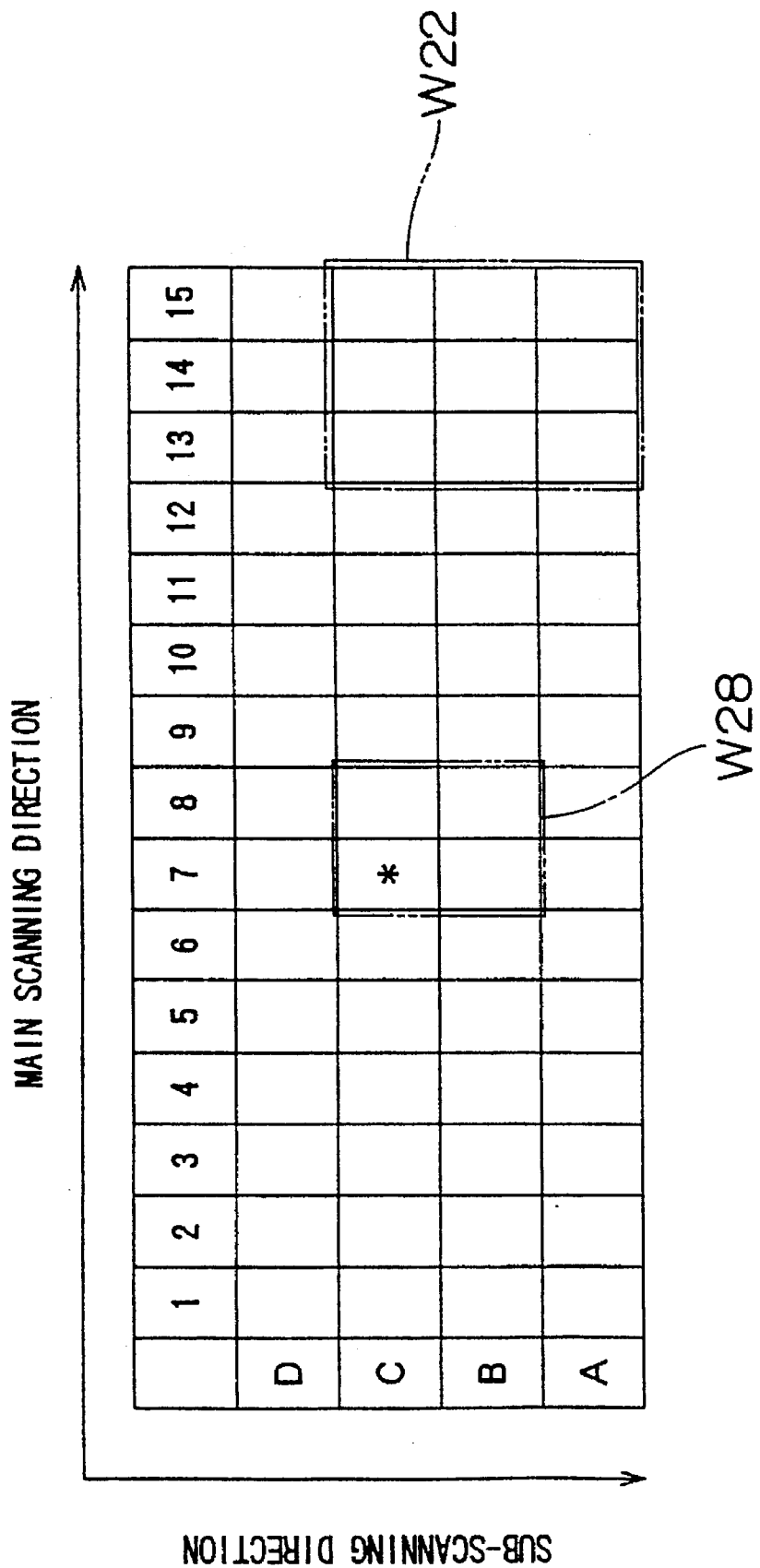

IMAGE PROCESSING METHOD AND APPARATUS

BACKGROUND OF THE INVENTION

1. Field of the Invention

The present invention relates to image processing methods and image processing apparatuses for properly processing a character image, gray-scale image and dotted image for high-quality image reproduction, which can be applied to such image processing apparatuses as facsimile machines and image scanners.

2. Description of the Related Art

An image processing apparatus like a facsimile machine which is designed to reproduce an optically read image as a binary image cannot properly reproduce an image by processing a gray-scale image such as photograph through the same image processing method as employed for processing a binary image such as a character image. For proper image reproduction, the character image including characters and diagrammatical drawings is processed by emphasizing the profile of the image (or the boundary between black pixels and white pixels of the image), while the gray-scale image is processed without being subjected to this profile emphasizing process.

However, in the case that an image including both the character image and gray-scale image is read by the facsimile machine, high-quality image reproduction cannot be expected through image processing dedicated for either the character image or gray-scale image. For this reason, the following image processing method has been proposed. When the constituent pixels of an image are successively processed as an object pixel, it is first judged which image area of a character image area and gray-scale image area each object pixel belongs to, and then a proper image processing of the respective image areas can be realized by performing a processing operation for the object pixel in accordance with the judgement result.

An art related to an image processing method for judging which image area of the character image area and gray-scale image area an object pixel belongs to will be described with reference to FIG. 2. An image processing circuit of a facsimile machine processes respective pixels as an object pixel X in the same order as an original-image reading order. When it is judged which image area of the character image area and gray-scale image area the object pixel X belongs to, reference is made to the density values of four pixels A, B, C and D which are located at the four corners of a 3×3 pixel matrix having the object pixel X in the center thereof. That is, provided that the characters A, B, C and D also denote the respective multivalued densities of the pixels A, B, C and D, a quadratic differential value S is calculated from the following equation (1):

$$S = \alpha\{(X-A)+(X-D)+(X-B)+(X-C)\} \quad (1)$$

where $\alpha$ is a given constant.

Then, the quadratic differential value S is compared with a predetermined threshold value, and the image area of the object pixel X is determined based on the comparison result. This is based on a fact that the character image has contrastive changes in the image density, while the gray-scale image has gradual changes in the image density. That is, the absolute value of the quadratic differential value S is large in the character image area, while the absolute value is small in the gray-scale image area. Therefore, the discrimination between the character image area and gray-scale image area can be achieved by judging on the magnitude of the quadratic differential value S.

However, since the discrimination between the character image area and gray-scale image area is based on only the quadratic differential value S in the aforesaid related art, the states of respective peripheral pixels and other factors are ignored. Therefore, there exists a problem that the image area is not necessarily properly determined.

More specifically, the image to be read by the facsimile machine includes a dotted image adapted to a printed photograph as well as the character image and gray-scale image. The dotted image is an image comprising dots orderly arranged in which the shading (or image density) of an original image is expressed by way of variation in dot size and dot density. In accordance with the aforesaid related art, pixels judged to belong to the gray-scale image area include pixels constituting a dotted image such as a printed photograph as well those constituting a photographic image or the like which is originally a gray-scale image.

In the facsimile machine, the gray-scale image is subjected to a half-tone image processing for expressing the gradational image density by way of variation in the dot density for image reproduction. However, if this half-tone image processing is applied to the dotted image which has a shading originally expressed by way of variation in the dot density, moire may be generated. Therefore, the aforesaid related art which is incapable of detecting constituent pixels in discrimination of the dotted image from the gray-scale image cannot necessarily perform a proper image processing.

SUMMARY OF THE INVENTION

To solve the foregoing technical problem, it is an object of the present invention to provide an image processing method which can properly detect constituent pixels in discrimination among a character image, gray-scale image and dotted image, and properly process any image type.

It is another object of the present invention to provide an image processing apparatus which can properly detect constituent pixels in discrimination among a character image, gray-scale image and dotted image, and properly process any image type.

To solve the foregoing technical problem, it is still another object of the present invention to provide an image processing apparatus which can perform a suitable image processing in accordance with the type of image without preventing the speed-up of the image processing.

It is yet another object of the present invention to provide an image processing method which can perform a suitable image processing in accordance with the type of image without preventing the speed-up of the image processing.

In accordance with one aspect of the present invention, a density variation value around an object pixel (a pixel to be processed) is calculated, based on differences in the density data between the object pixel and respective peripheral pixels around the object pixel. Then, the square of the density variation value is calculated, which is used as a first determination value for judging which image area among a character image, gray-scale image and dotted image the object pixel belongs to. The density variation value may be either a positive or negative value because it is calculated based on density differences between the object pixel and the respective peripheral pixels around the object pixel. On the other hand, the first determination value is always a positive value because it is the square of the density variation value. Therefore, it is not necessary to prepare both positive and negative threshold values, and hence the image processing method and the arrangement thereof can be simplified.

On the other hand, a second determination value is calculated for the aforesaid image area judging process by adding the first determination values of respective peripheral pixels having predetermined positional relations with respect to the object pixel. The second determination value is a value reflecting the states of the peripheral pixels as well as the object pixel. Therefore, the judgment on which image among the character image, gray-scale image and dotted image the object pixel is included in can be properly made in consideration of the states of the peripheral pixels.

In accordance with another aspect of the present invention, the type of image processing to be performed for an object pixel is determined with reference to image area judgment results concerning peripheral pixels having predetermined positional relations with respect to the object pixel. Therefore, a more suitable image processing can be performed for the object pixel in accordance with the states of the peripheral pixels.

In accordance with still another aspect of the present invention, first, second and third processes for processing the density data of the object pixel are performed in parallel with an image area judging process for judging which image area among a character image area, gray-scale image area and dotted image area an object pixel belongs to. Then, the density data subjected to the first, second or third process is selectively output, based on the result of the image area judgment. Therefore, the object pixel can be properly processed at a high speed in accordance with the type of image area to which the object pixel belongs.

In accordance with yet another aspect of the present invention, processing operations in an image area judging means, first processing means, second processing means and third processing means are performed based on density data which are read from a storage means and retained in a data retaining means. Accordingly, necessary data are not necessarily required to be stored in the storage means but to be retained in the data retaining means. Since it is not necessary to keep storing data which has been read out of the storage means to the data retaining means for data processing, new data can be written in data storage positions where the data already read out have been stored. Therefore, the storage means requires a less storage capacity.

In accordance with still another aspect of the present invention, even if density data of pixels belonging to N (integer) lines are required for performing parallel processing in an image area judging means, first processing means, second processing means and third processing means, a storage means having a storage capacity capable of storing density data for only (N−1) lines suffices for the processing.

In accordance with yet another aspect of the present invention, flags indicative of image area judgement results are stored in a flag storing means, and a selecting means is controlled with reference to the flags set for peripheral pixels around an object pixel. Therefore, the object pixel can be properly processed in consideration of the states of the peripheral pixels.

In accordance with still another aspect of the present invention, since new flags are written in storage positions where flags already read out have been stored, flags for M (integer) lines can be virtually stored in a flag storing means capable of storing flags for (M−1) lines. Therefore, the storage means requires a less storage capacity.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for explaining an image area judging process for judging which image area among a character image area, gray-scale image area and dotted image area a pixel belongs to.

FIG. 11 is a diagram for explaining a process for judging whether or not a differential filtering process should be performed.

FIG. 12 is a diagram for explaining a process for judging whether or not an integrating filtering process should be performed.

DETAILED DESCRIPTION OF THE PREFERRED EMBODIMENTS

Figure 1:
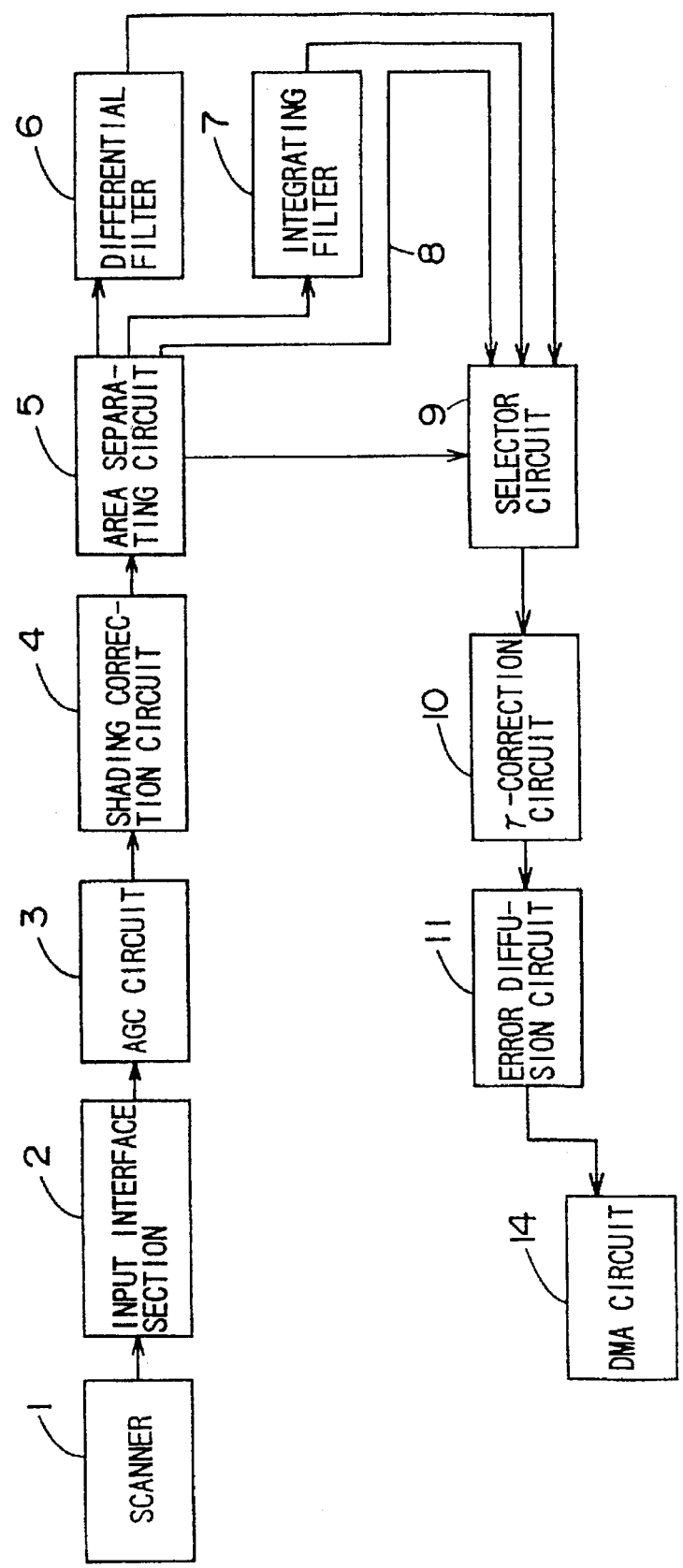
FIG. 1 is a block diagram illustrating the electrical construction of a facsimile apparatus relating to an image processing, to which a first embodiment of the present invention is applied.

FIG. 1 is a block diagram illustrating the electrical construction of a facsimile apparatus relating to an image processing, to which a first embodiment of the present invention is applied. A document original set on the facsimile apparatus is read by means of a scanner 1. The scanner 1 comprises an image sensor such as a CCD image sensor or CIS image sensor for reading images. Examples of the image sensor include an area image sensor for reading two-dimensional data and linear image sensor for reading line data. Typically, the linear image sensor is employed for constructing a less expensive apparatus.

The image data of the document original read by the scanner 1 is sent to an input interface section 2, which carries out a processing operation such as signal sample-hold processing. In accordance with this embodiment, the input interface section 2 comprises an analog circuit and, therefore, the aforesaid processing operation is performed on an analog basis.

The image data processed by the input interface section 2 is sent to an AGC circuit 3, which performs a gain control to adjust the level of a signal (image data signal) within a desired range.

The image data subjected to the gain control is sent to a shading correction circuit 4, in which a shading distortion is alleviated or removed. The shading distortion means unevenness in the density among pixels resulted from uneven illumination of, a light source used for reading a document original by means of the scanner 1.

The image data having alleviated or no shading distortion is sent to an area separating circuit 5. In the area separating circuit 5, it is judged whether the input image data is character image data generated by reading characters, gray-scale image data generated by reading such a gray-scale image as a photograph, or dotted image data generated by reading a printed photograph such as inserted in a news paper or magazine.

If the input image data includes a plurality of image data types, i.e., character image data, gray-scale image data and dotted image data, areas including respective image data types are separated. Area separation based on the type of image data ensures processing operations suitable for the respective image data types in the subsequent process.

The output side of the area separating circuit 5 is connected to a differential filter 6, integrating filter 7 and pass-through circuit 8 (a circuit for passing signals therethrough without performing any processing) in parallel for performing processing operations respectively for the character image data, dotted image data and gray-scale image data. The differential filter 6 performs a processing operation suitable for the character image data, and serves to emphasize the profile of the character image by making the boundary between black pixels and white pixels distinct. The integrating filter 7 performs a processing operation suitable for the dotted image data, and serves to smooth the dotted image data. The pass-through circuit 8 handles the gray-scale image data, and does not perform any processing operation.

These data are then sent to a selector circuit 9. A selection signal is input to the selector circuit 9 from the area separating circuit 5. In response to the selection signal, the selector circuit 9 selectively outputs data from the differential filter 6, integrating filter 7 or pass-through circuit 8. That is, the area separating circuit 5 sends to the selector circuit 9 a selection signal for allowing the selector circuit 9 to select a suitable output from the differential filter 6, integrating filter 7 or pass-through circuit 8, depending on which image area the object pixel belongs to.

The image data subjected to the foregoing process is sent to a γ-correction circuit 10, in which the sensitivity characteristic of the image data is corrected suitably for the vision characteristic of human eyes. Further, the image data is sent to an error diffusion circuit 11, and processed for high-quality half-tone image reproduction. The error diffusion circuit 11 performs a pseudo gray-scale image processing for reproducing the shading of the image by way of variation in the dot density. In this error diffusion circuit 11, multivalued density data is converted into binary-coded data. If the dotted image data after the shading correction is subjected to this pseudo gray-scale image processing, there is a possibility that the aforesaid moire is generated. In accordance with this embodiment, however, since the dotted image data sent to the error diffusion circuit 11 is preliminarily smoothed by the integrating filter 7, the moire is not generated. That is, by processing the dotted image data in the integrating filter 7, the dotted image data can be processed in the same manner as the gray-scale image data.

Further, since the character image data is preliminarily processed in the differential filter 6, the character image can be also properly represented by the binary-coded data obtained after the processing in the error diffusion circuit 11.

The image data subjected to the foregoing process is sent to a DMA (direct memory access) circuit 14 and then to a transmission circuit or to a printing circuit (not shown).

Among the aforesaid processing operations, the main subject of this embodiment is the processing operations performed in the area separating circuit 5, differential filter 6, integrating filter 7, pass-through circuit 8 and selector circuit 9, and the configuration thereof.

Figure 2:
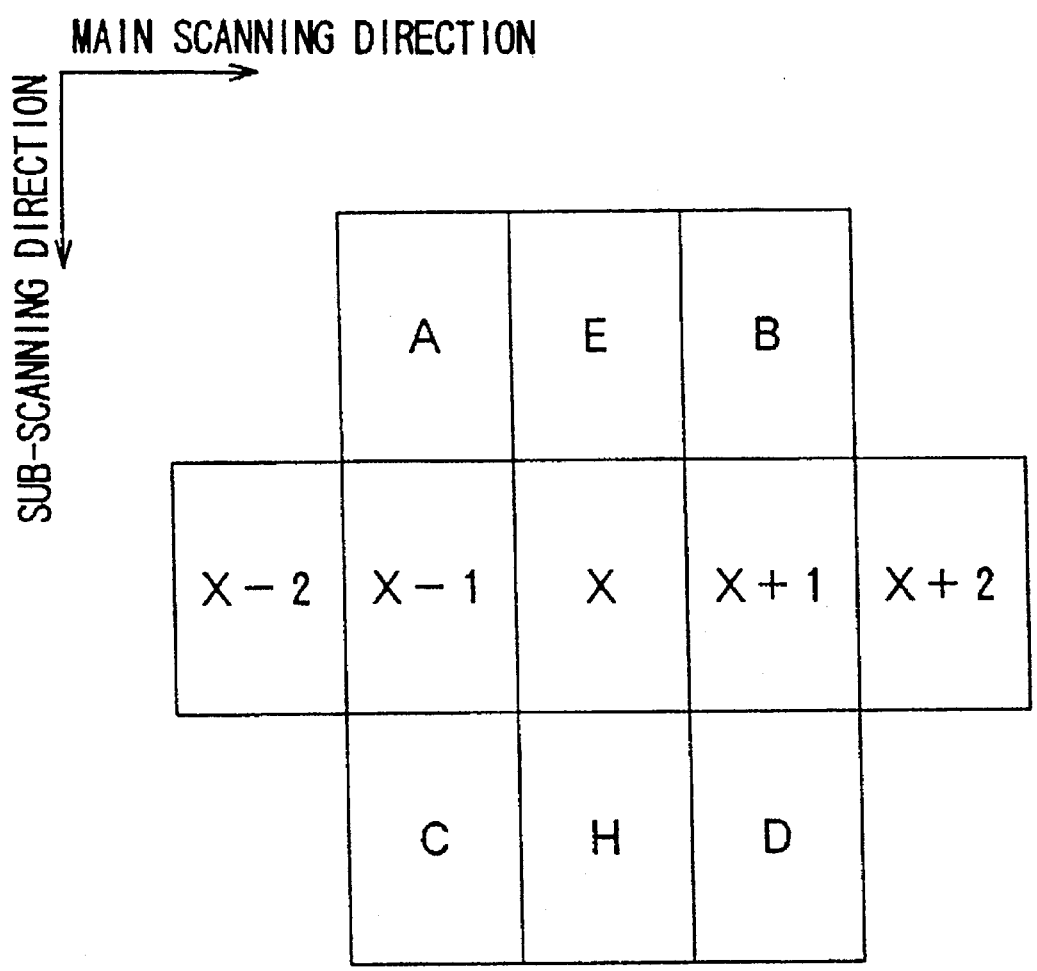

FIG. 2 is a diagram for explaining processing operations performed in the area separating circuit 5. The image data read by the scanner 1 are processed on a pixel basis in an image reading order. When each of the pixels is processed as an object pixel X, the density data (multivalued density data after the shading correction) of pixels A, B, C and D at the four corners of a 3×3 pixel matrix having the object pixel X in the center thereof are used. Provided that characters A, B, C and D also denote the respective density data of the pixels A, B, C and D, a quadratic differential value S(X) and the square SS(X) of the quadratic differential value S(X) are calculated from the following equations (2) and (3), respectively.

$$S(X)=\alpha\{(X-A)+(X-D)+(X-B)+(X-C)\} \quad (2)$$

$$SS(X)=S(X)^2 \quad (3)$$

The sum ΣSS(X) of the square values of the quadratic differential values obtained for five pixels X−2, X−1, X, X+1 and X+2 with the object pixel X being centered (which align in a main scanning direction of the image reading operation performed by the scanner 1) is calculated from the following equation (4):

$$\Sigma SS(X)=SS(X-2)+SS(X-1)+SS(X)+SS(X+1)+SS(X+2) \quad (4)$$

In this embodiment, the judgment is made on which image area among the character image area, gray-scale image area and dotted image area the object pixel X belongs to, by employing the aforesaid square value SS(X) and the square sum ΣSS(X) as principal determination values.

Figure 3:
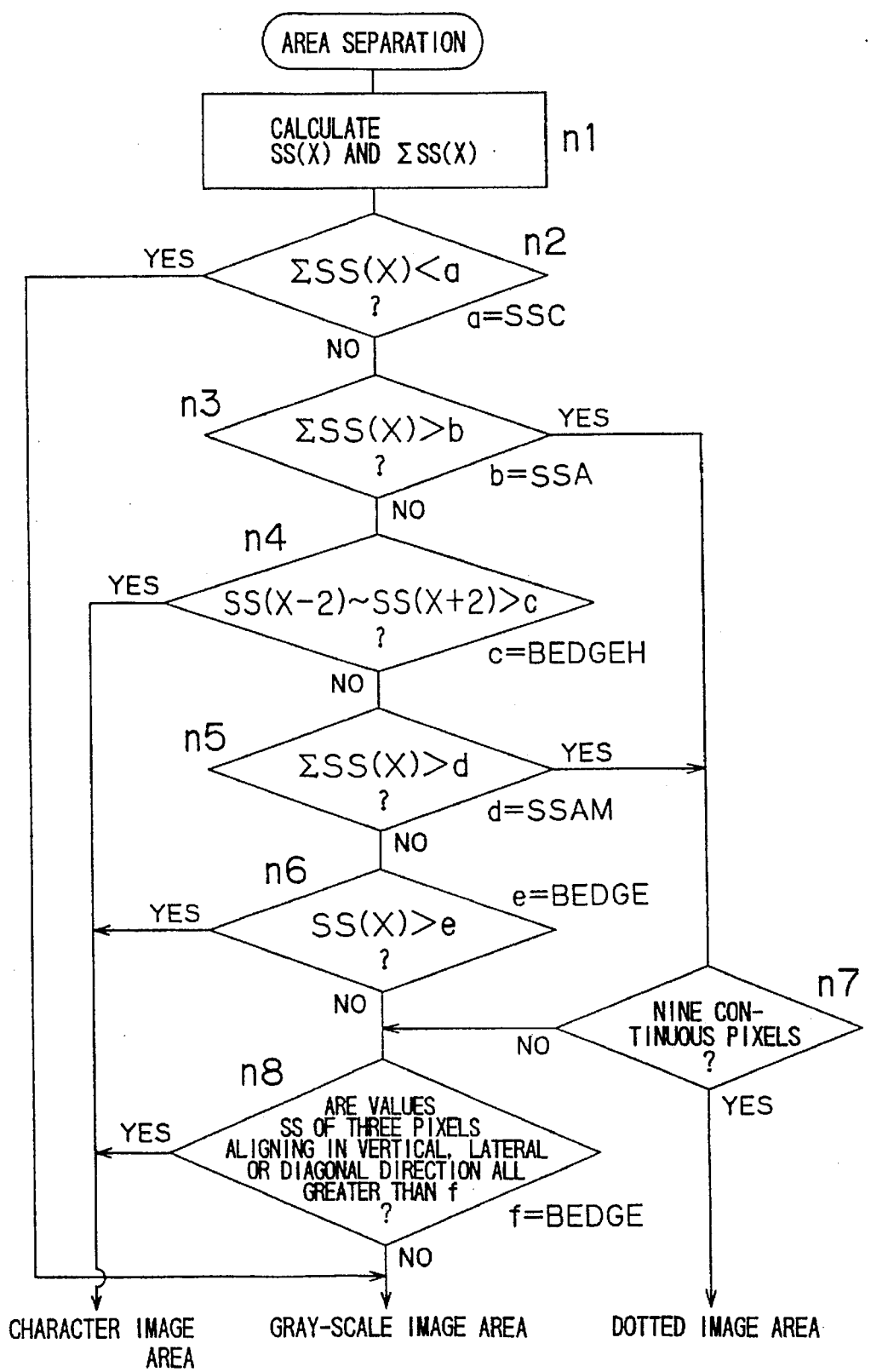
FIG. 3 is a flow chart for explaining an image area judging process.

FIG. 3 is a flow chart for explaining processing operations performed in the area separating circuit 5. First, the aforesaid square value SS(X) and the square sum ΣSS(X) are calculated (step n1). Then, a pixel belonging to the gray-scale image area is extracted, based on the following determination inequality (5) (step n2):

$$\Sigma SS(X)<a \quad (5)$$

where a is a predetermined threshold value for extracting a pixel belonging to the gray-scale image area. That is, it is determined in the step n2 that the object pixel X belongs to the gray-scale image area, if the inequality (5) is satisfied.

In a gray-scale image like A photographic image, the density difference between neighboring pixels is small, and hence the square value SS is also small. If the object pixel X belongs to the gray-scale image area, the square values SS of the five neighboring pixels are small, and hence the square sum ΣSS(X) must be a small value. Therefore, the judgment on whether or not the object pixel X belongs to the gray-scale image area can be made based on the aforesaid inequality (5). The number of pixels judged to belong to the gray-scale image area increases, as the threshold value a becomes larger.

If the aforesaid inequality (5) is not satisfied, a first dotted image area judgment is made based on the following inequality (6) (step n3):

$$\Sigma SS(X)>b \quad (6)$$

where b is a predetermined threshold value for extracting a pixel belonging to the dotted image area, and b>a. The number of pixels judged to belong to the dotted image area is decreased, as the threshold value b becomes larger.

If the inequality (6) is satisfied, a judgement is temporarily made that the object pixel X belongs to the dotted image area. This judgement is a tentative one, and it is judged again whether or not the object pixel X belongs to the dotted image area in a step n7, which will be described later.

The dotted image has 65 to 200 lines per inch on which dots are aligned. As the number of lines per inch increases, the dot density becomes higher, and the image density also becomes higher. Since the dotted image comprises dots, contrastive changes in the image density are observed in the microscopic view of the dotted image. Accordingly, if the object pixel X belongs to the dotted image area, any of the square values SS of the five pixels included in the square sum $\Sigma SS(X)$ takes a large value, and hence the square sum $\Sigma SS(X)$ takes a large value. Therefore, the judgment can be made on whether or not the object pixel X belongs to the dotted image area, based on the aforesaid inequality (6).

In case that the resolution of the scanner 1 is 16 pixels (dots)/mm, for example, pixels belonging to a dotted image having 85 lines to 200 lines per inch can be distinguished from each other for extraction, because the judgment is based on the square values SS of continuous five pixels. More specifically, the pixel interval resoluble by the scanner 1 is 0.0625 (1/16) mm, and the dot intervals of dotted images having 85 lines per inch and having 200 lines per inch are 0.300 (=25.4/85) mm and 0.127 (=25.4/200) mm, respectively. Therefore, the number of pixels existing between two adjacent dots in the dotted image having 85 lines per inch is four (∵0.300/0.0625=4.8), and the number of pixels existing between two adjacent dots in the dotted image having 200 lines per inch is two (∵0.127/0.0625=2.03). Accordingly, at least one of the five continuous pixels corresponds with a dot in the dotted image. Thus, pixels belonging to a dotted image having 85 lines to 200 lines per inch can be extracted through the judgement based on the square values SS of the five continuous pixels.

In accordance with this embodiment, pixels in a dotted image having 65 lines to 85 lines per inch are judged to belong to the character image area, and subjected to the processing operation performed in the differential filter 6. This is because, if pixels in a dotted image having a low dot density are to be regarded as belonging to the dotted image area in the image area judgment, pixels in the character image may be mistakenly judged to belong to the dotted image area. Further, it has been proved through an experiment that no moire was generated in an image reproduced from a dotted image having 65 lines to 85 lines per inch through the differential filtering process.

If the aforesaid inequality (6) is not satisfied, a first character image area judgment is made by judging whether or not the following inequalities (7) are satisfied (step n4):

$$SS(X-2)>c, \ SS(X-1)>c, \ SS(X)>c, \ SS(X+1)>c \text{ and } SS(X+2)>c \quad (7)$$

where c is a predetermined threshold value for the judgment of character image area. As the threshold value c becomes greater, the number of pixels judged to belong to the character image area is decreased.

In the character image including characters and diagrammatic drawings, a difference in the image density between neighboring pixels is significantly large and, therefore, the square value SS is also large. Since the characters and lines are formed by dot sequences, pixels having a large square value SS are continuously observed. Therefore, if all the SS values of the five continuous pixels aligning in the main scanning direction are large, it is determined that the object pixel X belongs to the character image area.

If the aforesaid inequalities (7) are not satisfied, a second dotted image area judgement is made by judging whether or not the following inequality (8) is satisfied (step n5):

$$\Sigma SS(X)>d \quad (8)$$

where d is a predetermined threshold value for extracting a pixel belonging to the dotted image area, and is smaller than the threshold value b for the first dotted image area judgement. That is, the threshold values a, b and d have a relationship of b>d>a. As the threshold value d becomes greater, the number of pixels judged to belong to the dotted image area is decreased.

If the aforesaid inequality (8) is satisfied, it is temporarily judged that the object pixel X belongs to the dotted image area.

The principle of the second dotted image area judgment is substantially the same as that of the aforesaid first dotted image area judgment. However, in case that the dotted image area has a large number of lines per inch, the dot density of the dotted image is increased, and the difference in the density data between the neighboring pixels is decreased due to the MTF (modulation transfer function) of the sensor employed for the scanner 1. Since the square sum $\Sigma SS$ is also decreased, there is a possibility that pixels in a dotted image area having a large number of lines per inch cannot be extracted in the aforesaid first dotted image area judgment. In accordance with this embodiment, pixels even in the dotted image area having a large number of lines per inch can be assuredly extracted by employing the threshold value d which is smaller than the threshold value b employed for the first dotted image area judgment.

If the aforesaid inequality (8) is not satisfied, a second character image area judgment is made by judging whether or not the following inequality (9) is satisfied (step n6):

$$SS(X)>e \quad (9)$$

where e is a predetermined threshold value for the judgment of the character image area. The threshold values c and e preferably have a relationship of c≧e. As the threshold value e is increased, the number of pixels judged to belong to the character image area is decreased.

If the aforesaid inequality (9) is satisfied, it is determined that the object pixel X belongs to the character image area. In accordance with the first character image area judgement in the step n4, though sequential pixels (or pixels constituting a line) in the character image area can be extracted, pixels constituting an isolated dot in the character image area cannot be extracted. Therefore, pixels having a large square value SS among those which have not been judged to belong to the dotted image area are judged to belong to the character image area.

If it is temporarily judged that the object pixel X belongs to the dotted image area in the first dotted image area judgment in the step n3 or in the second dotted image area judgment in the step n5, the image area of the object pixel X is judged again (step n7). That is, it is examined whether or not nine continuous pixels aligning in the main scanning direction with the object pixel X being centered are all temporarily judged in the first or second dotted image area judgement to belong to the dotted image area. If this condition is satisfied, it is determined that the object pixel X belongs to the dotted image area, and if not, it is not judged that the object pixel X belongs to the dotted image area.

If the aforesaid inequality (9) is not satisfied in the step n6 or if it is not judged in the step n7 that the object pixel X belongs to the dotted image area, a further processing operation is carried out (step n8). That is, it is examined whether or not the square values SS of three pixels aligning in a vertical direction, in a lateral direction, in a right diagonal direction or in a left diagonal direction are all greater than a predetermined threshold value f, i.e., it is judged whether or not any of the following inequalities (10) to (13) is satisfied (see FIG. 2). It is desired that a threshold value f is about the same as the threshold value e.

$$SS(E) > f, SS(X) > f \text{ and } SS(H) > f \quad (10)$$

$$SS(X-1) > f, SS(X) > f \text{ and } SS(X+1) > f \quad (11)$$

$$SS(B) > f, SS(X) > f \text{ and } SS(C) > f \quad (12)$$

$$SS(A) > f, SS(X) > f \text{ and } SS(D) > f \quad (13)$$

If at least one of the aforesaid inequalities (10) to (13) is satisfied, it is determined that the object pixel X belongs to the character image area, and if not, it is determined that the object pixel X belongs to the gray-scale image area.

Figure 4:
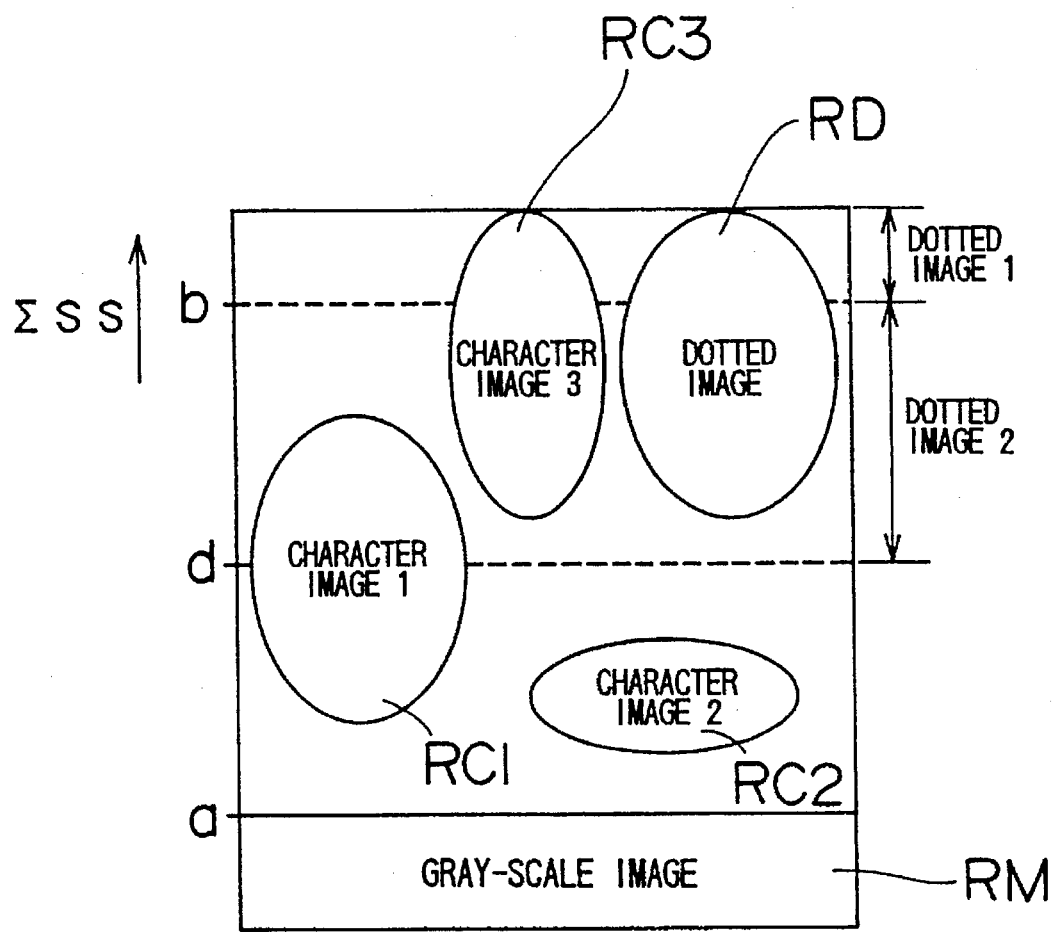
FIG. 4 is a conceptual diagram illustrating the relationship between a threshold value for a square sum $\Sigma SS$ and judgment result.

FIG. 4 is a conceptual diagram illustrating the relationship between a threshold value for the square sum ΣSS and judgment result. A pixel having a square sum ΣSS smaller than the threshold value a is classified to the gray-scale image area RM. A pixel having a square sum ΣSS greater than the threshold value b is temporarily judged to belong to the dotted image area in the first dotted image area judgment, and a pixel having a square sum ΣSS in a range between the threshold values d and b is also temporarily judged to belong to the dotted image area in the second dotted image area judgement. If nine pixels thus judged to belong to the dotted image area sequentially align, these pixels are classified to the dotted image area RD. A pixel judged to belong to the character image area in the first character image area judgement is classified to an area RC1, and a pixel so judged in the second character image area judgment is classified to an area RC2. Further, a pixel so judged in the process of the step n8 shown in FIG. 3 is classified to an area RC3. The image area of pixels which are not classified to any of the aforesaid areas is indeterminable. Such pixels are subjected to the same process as performed for the pixels in the gray-scale image area (the processing operation performed in the pass-through circuit 8).

The area separating circuit 5 generates and sends a selection signal to the selector circuit 9 in such a manner that the selector circuit 9 is allowed to select the output of the differential filter 6 for a pixel judged to belong to the character image area, to select the output of the integrating filter 7 for a pixel judged to belong to the dotted image area, and to select the output of the pass-through circuit 8 for a pixel judged to belong to the gray-scale image area.

However, if the following condition (1) or (2) is satisfied, the area separating circuit 5 generates a selection signal for allowing the selector circuit 9 to select the output of the pass-through circuit 8 even for a pixel judged to belong to the character image area.

(1) There exists at least one pixel judged to belong to the dotted image area in a 3×3 pixel matrix having the object pixel X in the center thereof. That is, any one of the pixels A, E, B, X−1, X+1, C, H and D (see FIG. 2) belongs to the dotted image area.

(2) It is judged that all the peripheral pixels X−1, X+1, C, H and D around the object pixel X belong to the gray-scale image area. Alternatively, it is judged that all the peripheral pixels A, E, B, X−1, X+1, C, H and D around the object pixel X belong to the gray-scale image area.

By thus performing the image area judging process, the density data of a pixel belonging to the dotted image area or gray-scale image area can be prevented from being mistakenly subjected to the differential filtering process which is intended for a pixel belonging to the character image area.

If it is judged that the object pixel belongs to the dotted image area, but there are not two or more pixels including the object pixel judged to belong to the dotted image area in a 2×2 pixel matrix for the integrating filtering process, the area separating circuit 5 generates a selection signal for allowing the selector circuit 9 to select the output of the pass-through circuit 8. That is, such object pixel is prevented from being subjected to the integrating filtering process. Thus, even if it is mistakenly judged that a constituent pixel of the character image belongs to the dotted image area, such a problem as a vague image profile can be prevented.

Next, processing operations in the differential filter 6, integrating filter 7 and pass-through circuit 8 will be described.

The differential filter 6 is a so-called Laplacian filter. More specifically, the differential filter 6 calculates a quadratic differential value S in the same manner as in the area separating circuit 5 from the following equation (14), and generates post-processing data FOUT shown in Table 1 to input the data FOUT to the selector circuit 9.

$$S(X)=2\{X-(A+B+C+D)/4\}=(\tfrac{1}{2})\{(X-A)+(X-B)+(X-C)+(X-D)\} \quad (14)$$

TABLE 1

| Value S | Processing | FOUT |
| --- | --- | --- |
| −256 ≦ S ≦ −128 | Forcible black processing | FOUT = 0 |
| −127 ≦ S < SLB | If X + S ≦ 0, forcible black processing | FOUT = 0 |
|  | If X + S > 0, black emphasizing processing | FOUT = X + S |
| SLB ≦ S ≦ SLW | No processing (Half-tone processing) | FOUT = X |
| SLW < S ≦ 127 | If X + S ≦ 127, white emphasizing processing | FOUT = X + S |
|  | If X + S > 127, forcible white processing | FOUT = 127 |
| 128 ≦ S ≦ 255 | Forcible white processing | FOUT = 127 |

In Table 1, SLB is a threshold value for a black pixel emphasizing processing operation, and SLW is a threshold value for a white pixel emphasizing processing operation.

If it is determined that the object pixel X belongs to the character image area, the selector circuit 9 selects image data in which the profile of the image is emphasized by means of the differential filter 6.

Multivalued image density data (density data obtained after the shading correction) of pixels in a 2×2 pixel matrix including the object pixel X are employed for the processing in the integrating filter 7. That is, the shading-corrected data of the pixels X, X+1, D and H are used for this processing operation (see FIG. 2). Provided that characters X, X+1, D and H also denote the respective density data of the pixels X, X+1, D and H, the processing operation performed in the integrating filter 7 is expressed by the following equation (15):

$$FOUT(X)=\{X+(X+1)+H+D\}/4 \quad (15)$$

That is, a value FOUT(X) for the object pixel X calculated from the equation (15) is output from the integrating filter 7.

By this processing operation, density differences between the object pixel X and adjacent pixels are reduced, and the image is smoothed. If it is determined that the object pixel X belongs to the dotted image area, the selector circuit 9 selects the density data smoothed by the integrating filter 7, as described above. Thus, the dotted image is smoothed to be made closer to a gray-scale image, and then subjected to the γ-correction process and the error diffusion process.

The pass-through circuit 8 does not perform any processing operation, but passes the image data therethrough, as previously mentioned. The selector circuit 9 selects the data output from the pass-through circuit 8 for a pixel judged to belong to the gray-scale image area.

In case that the reading resolution of the scanner 1 is 16 dots/mm and the MTFs after the shading correction are as shown in Table 2, it is desired to set the aforesaid threshold values a, b, c, d, e and f to the values shown in Table 3.

TABLE 2

| MTFs (%) after shading correction | | |
|---|---|---|
| | Main scanning direction | Sub-scanning direction |
| Black & white rectangular wave pattern of 8 dots/mm | 50 ± 10% | 50 ± 10% |
| Black & white rectangular wave pattern of 16 dots/mm | 10 to 20% | 10% Max. |

TABLE 3

| Threshold | Value setting (decimal) |
|---|---|
| a | 3200 |
| b | 24000 |
| c | 2500 |
| d | 3200 |
| e | 1024 |
| f | 1024 |

The MTF values shown in Table 2 were calculated from the following equation, based on the maximum density difference ΔA between adjacent lines of black and white line pair of 1 dot/mm by using rectangular wave charts of black and white 5-line pair (white and black line pair of facsimile test chart No. 1 of the Image Electronic Photography Association).

MTF(%)=(Detected maximum density difference between adjacent lines of black and white line pair)/ ΔA×100

Figure 5:
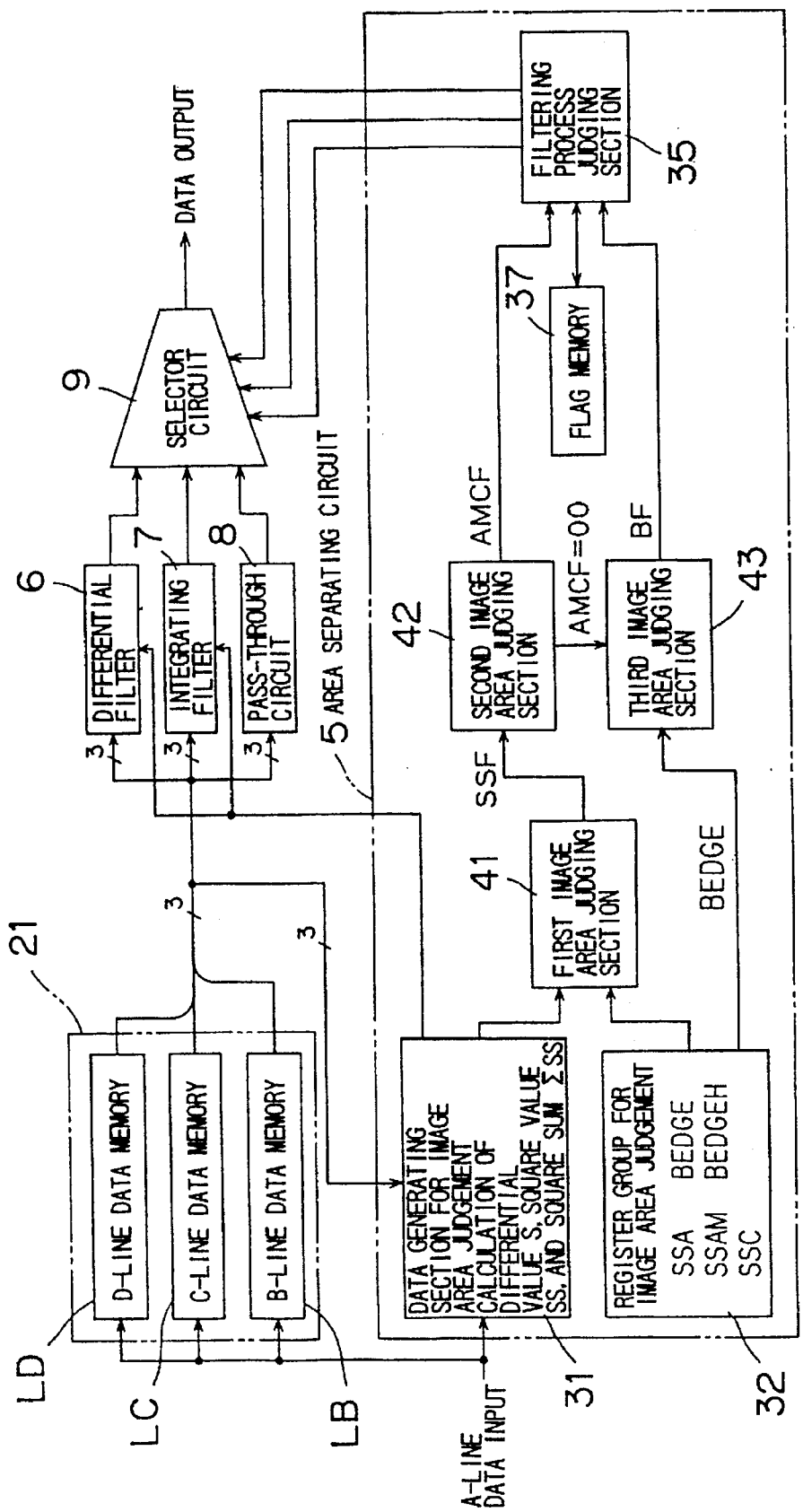
FIG. 5 is a block diagram illustrating a hardware construction for an image area judging process.

FIG. 5 is a block diagram illustrating a hardware construction relating to the area separating circuit 5. The data of pixels on four lines are employed for the processing operation in the area separating circuit 5. In the following explanation, a current line to which the data input from the shading correction circuit 4 belongs is called "line A", a line precedent to the line A is called "line B", a line precedent to the line B is called "line C", and a line precedent to the line C is called "line D".

Line data memories LD, LC and LB capable of storing the data of pixels on three lines are reserved in the storage area of an SRAM (static random access memory) 21 in the facsimile apparatus. The data of pixels on the line A successively input from the shading correction circuit 4 are stored in data storage positions where the data of pixels on the line D already processed have been stored. Thus, the processing of the data of the pixels on four lines can be carried out by using line buffers for three lines reserved in the SRAM 21.

The data stored in the line data memories LD, LC and LB are subjected to the processing operations performed in the differential filter 6, integrating filter 7 and pass-through circuit 8. After the data are subjected to the processing operation in which a pixel on the line C is regarded as an object pixel, the selector circuit 9 selects one of the data output from the differential filter 6, integrating filter 7 and pass-through circuit 8. The selected data is input to the γ-correction circuit 10 (see FIG. 1).

The data of pixels on the current line output from the shading correction circuit 4 and the data of pixels on the lines B, C and D output from the SRAM 21 are input to the area separating circuit 5. Then, with a pixel on the line C being regarded as an object pixel, it is judged which image area among the character image area, dotted image area and gray-scale image area the object pixel on the line C belongs to.

The area separating circuit 5 includes a data generating section 31 for image area judgment. The data generating section 31 for image area judgement calculates the aforesaid quadratic differential values S, the square values SS of the quadratic differential values S, and the sum ΣSS of the square values SS of the neighboring five pixels. The data generating section 31 for image area judgement incorporates a shift register for retaining necessary data of pixels on the lines A, B, C and D, which will be described later. Part of the data retained in the shift register incorporated in the data generating section 31 are used for the processing operations performed in the differential filter 6 and integrating filter 7.

The area separating circuit 5 further comprises a register group 32 including a plurality of registers which respectively retain a threshold value SSA (corresponding to the threshold value b in the aforesaid inequality (6)), a threshold value SSAM (corresponding to the threshold value d in the aforesaid inequality (8)), a threshold value SSC (corresponding to the threshold value a in the aforesaid inequality (5)), a threshold value BEDGE (corresponding to both of the threshold values e and f in the aforesaid inequality (9) and (10)), and a threshold value BEDGEH (corresponding to the threshold value c in the aforesaid inequality (7)), which are all used for the image area judgment. The data to be retained in the registers in the register group 32 are variably set by a control circuit (not shown), and input from an input device (not shown) connected with the control circuit. As the input device, a key input device fitted onto the facsimile apparatus may be employed or, alternatively, an external input device may be attached thereto as required. The alteration of the data retained in the respective registers makes it possible to change the numbers of pixels to be judged to belong to the character image area, gray-scale image area and dotted image area, thereby adjusting the image texture.

The values S, square values SS and square sum ΣSS generated in the data generating section 31 for image area judgment and the threshold values retained in the register group 32 for image area judgment are input to a first image area judging section 41. Then, the square values SS and square sum ΣSS are compared with the aforesaid threshold values SSA, SSAM, SSC, BEDGE and BEDGEH in the first image area judging section 41. Based on the comparison result, the first image area judging section 41 generates for each of the pixels a 2-bit flag SSF indicative of a tentative judgement on which image area among the character image area, gray-scale image area and dotted image area the pixel belongs to.

The values of the flag SSF, for example, have the following definitions:

SSF=11 It has been tentatively judged that the pixel belongs to the dotted image area.

SSF=01 It has been tentatively judged that the pixel belongs to the gray-scale image area.

SSF=10 It has been tentatively judged that the pixel belongs to the character image area.

SSF=00 No judgement has been made.

The flag SSF is input to a second image area judging section 42. Based on the flag SSF, a second image area judging section 42 judges whether or not nine pixels aligning in the main scanning direction with the object pixel being centered all belong to the dotted image area, and then generates a 2-bit flag AMCF. The values of the flag AMCF have the following definitions:

AMCF=11 It has been judged that the pixel belongs to the dotted image area.

AMCF=01 It has been judged that the pixel belongs to the gray-scale image area.

AMCF=10 It has been judged that the pixel belongs to the character image area.

AMCF=00 No judgement has been made.

The flag AMCF is input to a filtering process judging section 35 and to a third image area judging section 43. For the image area judgement of a pixel having a flag value of AMCF=00, a third image area judging section 43 judges whether or not the square values SS of three pixels aligning in vertical, lateral and diagonal directions with the object pixel being centered are all greater than the threshold value BEDGE (i.e., the processing operation in the step n8 shown in FIG. 3). Based on the judgement, the third image area judging section 43 generates a 1-bit flag BF. That is, if a positive judgement is made, the flag BF is set to BF=1 indicating that the pixel belongs to the character image area, and if a negative judgement is made, the flag BF is set to BF=0 indicating that the pixel belongs to the gray-scale image area. The flag BF is also input to the filtering process judging section 35.

Based on the flags AMCF and BF, the filtering process judging section 35 judges which image area among the character image area, gray-scale image area and dotted image area the object pixel belongs to, and inputs a 3-bit selection signal to the selector circuit 9 in accordance with the judgement result. More specifically, the filtering process judging section 35 generates a selection signal in such a manner that the flags and the circuit to be selected by the selector circuit 9 have the following relation:

| | |
|---|---|
| AMCF = 11 | Integrating filter 7 |
| AMCF = 01 | Pass-through circuit 8 |
| AMCF = 10 | Differential filter 6 |
| AMCF = 00 and BF = 1 | Differential filter 6 |
| AMCF = 00 and BF = 0 | Pass-through circuit 8 |

However, in case that at least one of pixels in a 3×3 pixel matrix having the object pixel in the center thereof belongs to the dotted image area, or peripheral pixels around the object pixel (eight peripheral pixels around the object pixel or the pixels X-1, C, H, D and X+1 shown in FIG. 2) all belong to the gray-scale image area, a selection signal for allowing the selector circuit 9 to select the output of the pass-through circuit 8 is generated even if the differential filter 6 is otherwise to be selected.

Further, in case that two or more pixels belonging to the dotted image area are not included in a 2×2 pixel matrix including the object pixel (a pixel matrix including the pixels X, X+1, H and D shown in FIG. 2), that is, in case that only the object pixel belongs to the dotted image area, a selection signal for allowing the selector circuit 9 to select the output of the pass-through circuit 8 even if the integrating filter 7 is otherwise to be selected. This is based on the fact that a pixel in the dotted image area cannot exist alone. That is, if there exists alone a pixel judged to belong to the dotted image area, the integrating filtering process is omitted, because the judgement is probably erroneous.

Based on the flags AMCF and BF, the filtering process judging section 35 regenerates a flag AMCF indicative of the final judgement result, and writes the regenerated flag AMCF in a flag memory 37. The flag memory 37 is provided in the storage area of the SRAM 21. The regenerated flag AMCF takes any of the following values:

If AMCF=11, AMCF=11

If AMCF=01, AMCF=01

If AMCF=10, AMCF=10

If AMCF=00 and BF=1, AMCF=10

If AMCF=00 and BF=0, AMCF=00

Figure 6:
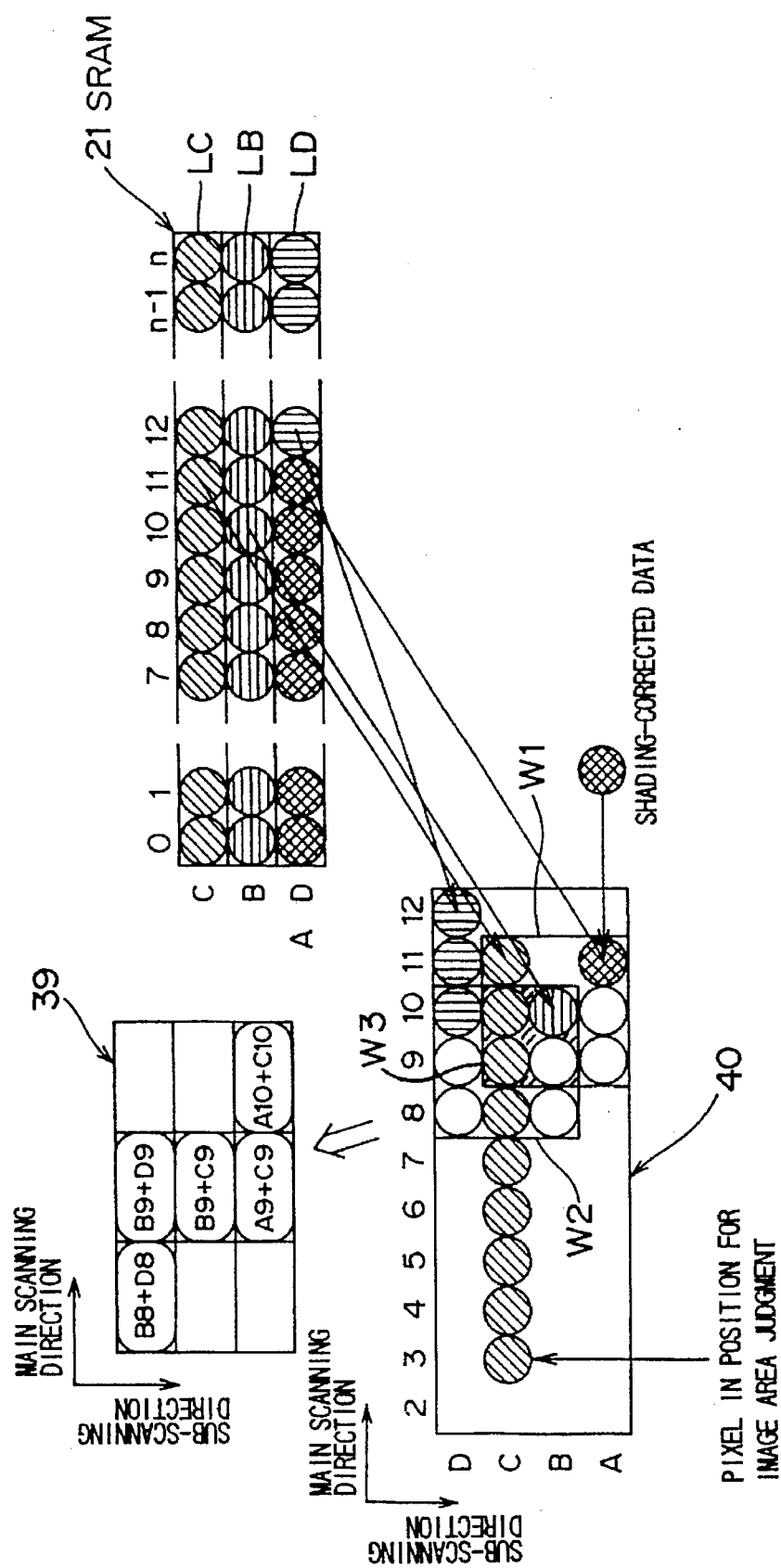
FIG. 6 is a diagram for explaining a process for generating a determination value for an image area judging process.
Figure 7:
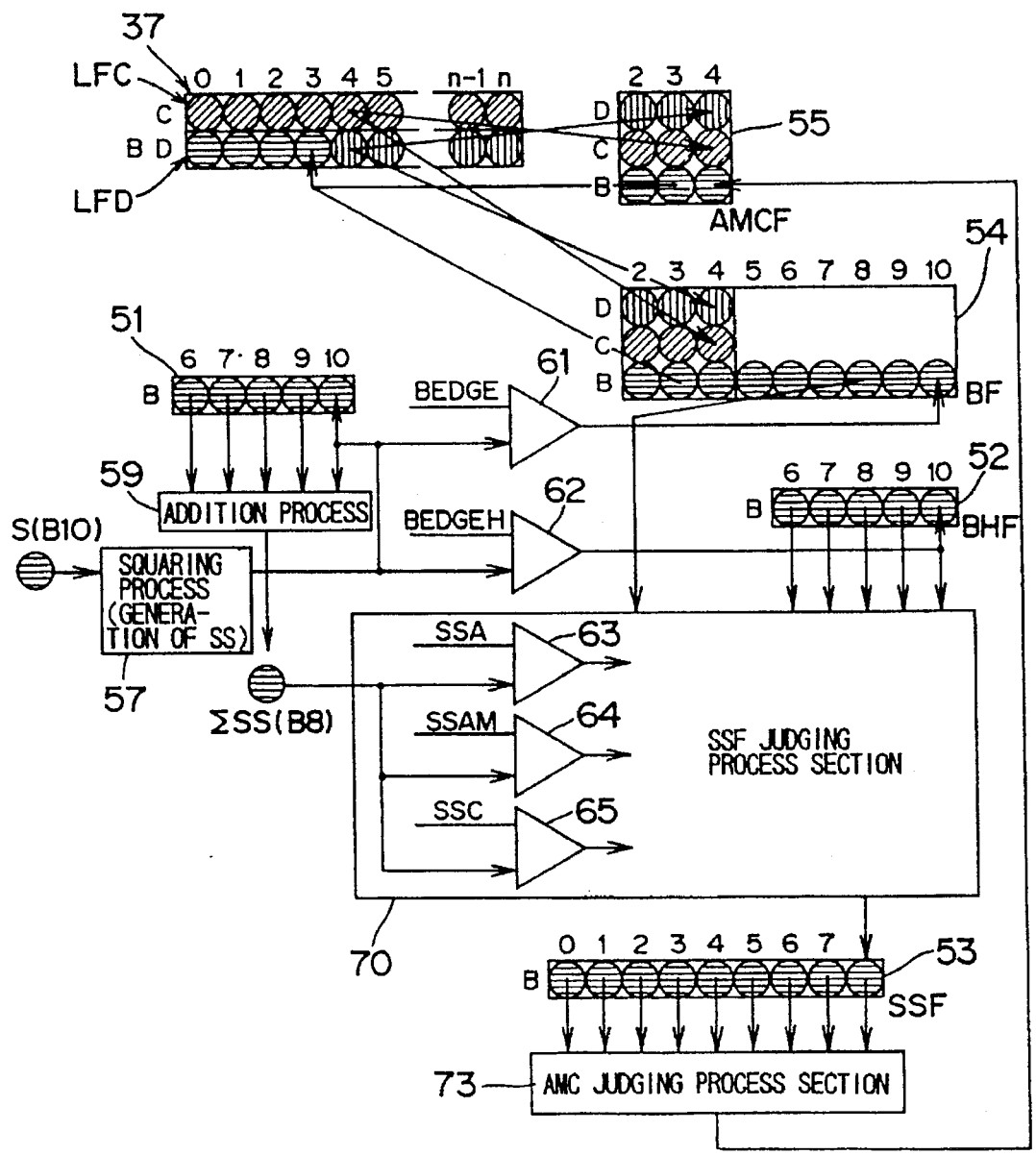
FIG. 7 is a diagram for explaining a process for generating a flag for image area judging process using a determination value.

FIG. 6 is a diagram for explaining a processing operation in the data generating section 31 for image area judgment. In FIGS. 6 and 7, the data of pixels on the line A are indicated by a mesh shading, the data of pixels on the line B by a horizontal line shading, the data of pixels on the line C by an oblique line shading, and the data of pixels on the line D by a vertical line shading.

The data of the pixels on the three lines stored in the line data memories LB, LC and LD reserved in the storage area of the SRAM 21 are read into the shift register 40 incorporated in the data generating section 31 for image area judgement. The shift register 40 retains necessary data of the pixels on lines A, B, C and D, and shifts the data in a direction opposite the main scanning direction. The shift register 40 has one-column arrangement for the lines A and B, nine-column arrangement for the line C, and three-column arrangement for the line D. Each column can retain the shading-corrected data of one pixel. Reference character W1 denotes a window for the calculation of the quadratic differential values S, and reference character W2 denotes a window for the differential filtering process. Reference character W3 formed in the overlapped portion of the windows W1 and W2 denotes a window for the integrating filtering process.

The processing operations in the shift register 40 will be hereinafter described on the assumption that the data of a pixel A11 located in the 11th column on the line A has been just been processed in the shading correction circuit 4. In this case, pixels up to a pixel C3 have already been subjected to the area separating process.

The shading-corrected data of the pixel A11 is stored in the shift register 40 and the line data memory LD. The data of the pixel A11 is stored in a data storing position where the data of a pixel D11 has been stored. Accordingly, the data of the pixel D11 is deleted from the SRAM 21. Since the data of the pixel D11 is read into the shift register 40 before the data of the pixel A11 is written into the data storing position of the pixel D11, there occurs no problem. That is, the data of pixels D10, D11 and C3 to C10 are written in the shift register 40 before the data of the pixel A11 is written in the shift register 40 and in the line data memory LD.

After the writing of the shading-corrected data of the pixel A11, the shading-corrected data of the pixels D12, C11 and B10 are read into the shift register 40 from the SRAM 21. Accordingly, the shading-corrected data of the pixels D10 to D12, C3 to C11, B10 and A11 are retained in the shift register 40.

The data generating section 31 for image area judgement further incorporates another shift register 39. The shift register 39 includes a 2-column shift register for retaining the sum of the shading-corrected data of pixels on the lines B and D, a shift register for retaining the sum of the shading-corrected data of pixels on the lines B and C, and a 2-column shift register for retaining the sum of the shading-corrected data of pixels on the lines A and C. The shift register 39 can shift the data retained therein in a direction opposite the main scanning direction.

Before the shading-corrected data of the pixel A11 is input to the shift register 39, the sum of the data of pixels B8 and D8, the sum of the data of pixels B9 and D9, the sum of the data of pixels B9 and C9, the sum of the data of pixels A9 and C9, and the sum of the data of pixels A10 and C10 are preliminarily calculated and stored in the shift register 39.

Based on the data retained in the shift registers 39 and 40, the quadratic differential value S is calculated with the pixel B10 being regarded as an object pixel. That is, the quadratic differential value S(B10) of the pixel B10 is calculated from the following equation (16):

$$S(B10)=\alpha\{(B10-C9)+(B10-C11)+(B10-A9)+(B10-A11)\}=4\alpha[B10-\{(A9+C9)+A11+C11\}/4] \quad (16)$$

Further, the data retained in the shift registers 39 and 40 are sent to the differential filter 6 and integrating filter 7, in which predetermined processing operations are performed.

In the differential filter 6, the quadratic differential value S(C9) is calculated with the pixel C9 being regarded as an object pixel from the following equation (17):

$$S(C9)=2[C9-\{(B8+D8)+B10+D10\}/4 \quad (17)$$

By using a value [B8+D8] retained in the shift register 39 for the calculation, addition steps can be reduced, and hence the hardware construction of the differential filter 6 can be simplified.

By performing a processing operation as shown in Table 1 based on the calculated quadratic differential value S(C9), the data FOUT(C9) for the pixel C9 after the filtering process is obtained.

In the integrating filter 7, data IOUT(C9) to be obtained after the filtering process is calculated with the pixel C9 being regarded as an object pixel from the following equation (18):

$$IOUT(C9)=\{(B9+C9)+B10+C10\}/4 \quad (18)$$

By using a value [B9+C9] retained in the shift register 39 for the calculation, addition steps can be reduced, and hence the hardware construction of the integrating filter 7 can be simplified.

The data [B9+D9] retained in the shift register 39 is used for the differential filtering process for the pixel C10, and the data [A10+C10] is used for the calculation of the quadratic differential value S of the pixel B11.

At the time when the shading-corrected data of the pixel A11 is input, the image area judging process for the pixel C3 has just finished. This is due to the delay in a pipe-line process performed in the area separating circuit 5. The data corresponding to the processing results for the pixels C3 to C9 obtained through the differential filtering processing, integrating filtering processing and pass-through processing are retained in shift registers (not shown) respectively incorporated in the differential filter 6, integrating filter 7 and pass-through circuit 8 for the timing adjustment for the delay in the pipe-line process. At the time when the shading-corrected data of the pixel A11 is input to the shift register 40 and SRAM 21, the data of the pixel C3 are input to the selector circuit 9 from the differential filter 6, integrating filter 7 and pass-through circuit 8.

FIG. 7 is a diagram for explaining the image area separation judging process, which illustrates processing operations performed when the quadratic differential value S(B10) of the pixel B10 is input.

The construction for an image area separation judging process will be first outlined. There are provided a shift register 51 capable of retaining square values SS for the five latest pixels on the line B, a shift register 52 capable of retaining flags BHF indicative of comparison results obtained by comparing between the threshold value BEDGEH and the square values SS of the five latest pixels on the line B, a shift register 53 capable of retaining flags SSF for nine pixels B0 to B8 on the line B, a shift register 54 capable of retaining flags BF for pixels in a 3×3 pixel matrix having the pixel C3 in the center thereof and pixels B5 to B10 on the line B (corresponding to the comparison results between the threshold value BEDGE and square values SS), and a shift register 55 capable of retaining flags AMCF for pixels in the 3×3 pixel matrix having the pixel C3 in the center thereof, all of which shift registers are incorporated in the filtering process judging section 35. The aforesaid flag memory 37 capable of retaining flags AMCF and BF for pixels on two lines is reserved in the storage area of the SRAM 21. The flag memory 37 has line data memories LFC and LFD. The flag memory 37 may retain 3-bit data of flags AMCF and BF for each of the pixels or, alternatively, 2-bit composite data which are composed of the data of the flags AMCF and BF for each of the pixels.

The quadratic differential value S(B10) of the pixel B10 is input to a squaring process section 57 in which a square value SS(B10) is calculated. The square value SS(B10) is input to the shift register 51 and to comparators 61 and 62.

The square values SS for the five pixels B6 to B10 retained in the shift register 51 are summed in an addition process section 59, whereby a square sum ΣSS(B8) for the pixel B8 is calculated. The square sum ΣSS(B8) is input to a SSF judging process section 70 for the generation of a flag SSF.

The square value SS(B10) of the quadratic differential value S(B10) for the pixel B10 is compared with the threshold values BEDGE and BEDGEH in the comparators 61 and 62, respectively. The comparison result obtained in the comparator 61 is stored as a 1-bit flag BF in the shift register 54. If the square value SS(B10) is greater than the threshold value BEDGE, the flag BF is set to BF=1 and, if not, BF=0. On the other hand, the comparison result obtained in the comparator 62 is stored as a 1-bit flag BHF in the shift register 52. If the square value SS(B10) is greater than the threshold value BEDGEH, the flag BHF is set to BHF=1 and, if not, BHF=0.

The flags BHF for the five pixels retained in the shift register 52 and the flag BF for the pixel B8 retained in the shift register 54 are sent to the SSF judging process section 70.

The SSF judging process section 70 comprises comparators 63, 64 and 65 for respectively comparing the input square sum ΣSS with the threshold values SSA, SSAM and SSC. The SSF judging process section 70 performs the processing operations shown in FIG. 3. More specifically, the SSF judging process section 70 generates a flag SSF in accordance with the following process, and stores the generated flag SSF in the shift register 53.

(1) If ΣSS<SSC, the flag SSF is set to SSF=01 (corresponding to the gray-scale image area). This processing operation corresponds to that of the step n2 shown in FIG. 3.

(2) If ΣSS>SSA, the flag SSF is set to SSF=11 (corresponding to the dotted image area). This processing operation corresponds to the first dotted image area judging process performed in the step n3 shown in FIG. 3.

(3) If SSA≧ΣSS≧SSC and the values of the flags BHF for the five pixels sent from the shift register 52 are all "1" (which means SS>BEDGEH), the flag SSF is set to SSF=10 (corresponding to the character image area). This processing operation corresponds to that of the step n4 shown in FIG. 3.

(4) If at least one of the values of the flags BHF for the five pixels sent from the shift register 52 is "0" and SSA≧ΣSS>SSAM, the flag SSF is set to SSF=11 (corresponding to the dotted image area). This processing operation corresponds to the second dotted image area judging process performed in the step n5 shown in FIG. 3.

(5) If SSAM≧ΣSS≧SSC and the value of the flag BF for the pixel B8 sent from the shift register 54 is "1" (which means SS>BEDGE), the flag SSF is set to SSF=10 (corresponding to the character image area). This processing operation corresponds to the YES-branching process of the step n6 shown in FIG. 3.

(6) If SSAM≧ΣSS≧SSC and the value of the flag BF for the pixel B8 sent from the shift register 54 is "0" (which means SS≧BEDGE), the flag SSF is set to SSF=00 (corresponding to indeterminate image area). This processing operation corresponds to the NO-branching process of the step n6 shown in FIG. 3.

The flags SSF for the nine continuous pixels B0 to B8 retained in the shift register 53 are input to an AMC judging process section 73. The AMC judging process section 73 generates a flag AMCF for the pixel B4, and examines whether all the values of the flags SSF for the nine pixels retained in the shift register 53 are "1" (which means the dotted image area). Then, the AMC judging process section 73 performs the following processing operation.

(a) If the values of the flags SSF for the nine pixels are all "11", the flag AMCF is set to AMCF=11, and it is determined that the pixel B4 belongs to the dotted image area. (This processing operation corresponds to that of the step n7 shown in FIG. 3.)

(b) If at least one of the flags SSF for the nine pixels takes a value other than "11", the AMC judging process section 73 performs different processing operations as follows, depending on the values of the flags SSF.

(1) If SSF=10 (corresponding to the character image area), the flag AMCF is set to AMCF=10, and it is determined that the pixel B4 belongs to the character image area.

(2) If SSF=01 (corresponding to the gray-scale image area), the flag AMCF is set to AMCF=01, and it is determined that the pixel B4 belongs to the gray-scale image area.

(3) If SSF=11 (corresponding to the dotted image area), the flag AMCF is set to AMCF=00, and the image area of the pixel B4 is not determined.

(4) If SSF=00 (corresponding to indeterminate image area), the flag AMCF is set to AMCF=00, and the image area of the pixel B4 remains indeterminate.

The flag AMCF thus obtained for the pixel B4 is input to the shift register 55.

The flags AMCF for the pixels D2 to D4, C2 to C4, B2 and B3 are read out of the flag memory 37 and stored in the shift register 55. Based on the flags AMCF for the pixels in a 3×3 pixel matrix retained in the shift register 55, the AMC judging process section 73 examines whether or not there exists a pixel belonging to the dotted image area (a pixel having a flag value of AMCF=11) around the pixel C3. If there exists at least one pixel belonging to the dotted image area around the pixel C3 and the pixel C3 has a flag value of AMCF=10 corresponding to the character image area, the AMC judging process section 73 sends to the selector circuit 9 a selection signal for allowing the selector circuit 9 to select the output of the pass-through circuit 8 for the pixel C3.

Further, based on the flags AMCF for the pixels in the 3×3 pixel matrix retained in the shift register 55, the AMC judging process section 73 judges whether all the peripheral pixels C2, C4, B2, B3 and B4 around the pixel C3 belong to the gray-scale image area (or have a flag value of AMCF=01). If it is judged that all the pixels C2, C4, B2, B3 and B4 belong to the gray-scale image area, and the pixel C3 has a flag value of AMCF=10 corresponding to the character image area, the AMC judging process section 73 sends to the selector circuit 9 a selection signal for allowing the selector circuit 9 to select the output of the pass-through circuit 8 for the pixel C3. Instead of the aforesaid condition, such a condition that all the pixels D2 to D4, C2, C4 and B2 to B4 belong to the gray-scale image area may be employed for allowing the selector circuit 9 to select the output of the pass-through circuit 8 when the pixel C3 has a flag value of AMCF=10.

If the aforesaid condition concerning the flags AMCF of the pixels in the 3×3 pixel matrix retained in the shift register 55 is not satisfied, a selection signal is generated in accordance with the value of the flag AMCF of the pixel C3. That is, if AMCF=11, the output of the integrating filter 7 is selected; if AMCF=10, the output of the differential filter 6 is selected; and if AMCF=01, the output of the pass-through circuit 8 is selected.

However, if the flag AMCF is set to AMCF=00, the following processing operation is performed by using the data retained in the shift register 54. First, the flags AMCF of the pixels D2 to D4 and C2 to C4 are read out of the flag memory 37, and retained in the shift register 54. For the pixels on the line B, 1-bit flags BF are retained in the shift register 54. Then, it is examined whether all three pixels in any one of the groups of vertically aligning pixels D3, C3 and B3, laterally aligning pixels C2, C3 and C4, right-diagonally aligning pixels B2, C3 and D4 and left-diagonally aligning pixels B4, C3 and D2 in the 3×3 pixel matrix having the pixel C3 in the center thereof have a value of the flag AMCF corresponding to a pixel belonging to the character image area or the value of the flag BF corresponding to SS>BEDGE. If this condition is satisfied, the flag AMCF of the pixel C3 is reset to AMCF=10 corresponding to a pixel belonging to the character image area, and a selection signal for allowing the selector circuit 9 to select the output of the differential filter 6 is input to the selector circuit 9. If the aforesaid condition is not satisfied, the value of the flag AMCF for the pixel C3 remains as the previous value of AMCF=00. In this case, the output of the pass-through circuit 8 is selected, similarly to the case where it is judged that the pixel belongs to the gray-scale image area. After this process, a new value of the flag AMCF for the pixel C3 is rewritten in the flag memory 37.

On the other hand, based on the flag AMCF for the pixel B3 stored in the shift register 55 and the flag BF for the pixel B3 stored in the shift register 54, a 2-bit flag AMCF for the pixel B3 is newly generated, and stored in the line data memory LFD of the flag memory 37. More specifically, the new flag AMCF is generated in the following manner.

(1) If AMCF≠00, the value of the flag AMCF retained in the shift register 55 is employed as a new flag value.
(2) If AMCF=00 and BF=1 (SS>BEDGE), the flag AMCF is set to AMCF=10 (corresponding to the character image area).
(3) If AMCF=00 and BF=0 (SS≦BEDGE), the flag AMCF is set to AMCF=00.

The flags AMCF of the pixels on the line D as well as those on the line B are stored in the line data memory LFD. Therefore, the writing of the flag AMCF of the pixel B3 should be carried out after the flag AMCF of the pixel D3 is read out to the shift registers 54 and 55. Thus, the data of pixels on three lines can be processed by using the flag memory 37 for two lines.

In accordance with this embodiment, the sum ΣSS of the square values SS for five continuous pixels aligning in the main scanning direction is employed for judging which image area among the character image area, gray-scale image area and dotted image area an object pixel belongs to. Therefore, the states of peripheral pixels around the object pixel can be taken into account, so that an accurate judgement can be made on which image area the object pixel belongs to. Thus, a proper processing operation can be performed for each of the pixels in different image areas. In particular, such a problem as the generation of moire can be assuredly prevented when a dotted image is reproduced.

Further, the threshold values of the square value SS and square sum ΣSS are set for each of the character image areas, gray-scale image area and dotted image area for the extraction thereof, so that the image area of a pixel can be accurately judged.

Since the square values SS of the quadratic differential values S and the sum ΣSS of the square values SS for five pixels are employed as determination values instead of the quadratic differential values S, the determination values never take a negative value. If the quadratic differential value S was employed, both positive and negative threshold values would be required because the quadratic differential value S could take either a positive or negative value. However, since the square value SS and square sum ΣSS are employed as determination values, threshold values for these determination values are set only in a positive range. Therefore, the hardware construction can be simplified.

In accordance with the aforesaid hardware construction, the filtering process such as differential filtering process and integrating filtering process and the image area judging process for an object pixel are performed in parallel. Therefore, at the time when the image area judgement for the object pixel is completed, the data subjected to the differential filtering process, integrating filtering process and pass-through process are ready for use. Therefore, a proper processing operation can be performed for each of the pixels belonging to the character image area, gray-scale image area and dotted image area only by selecting any one of the prepared data based on the image area judgment. Thus, the image processing operation can be carried out at a very high speed.

Further, in accordance with the aforesaid hardware construction, the processing operation for the respective pixels in the area separating circuit 5 is carried out by way of pipe-line processing. Therefore, the image area judging operations for a plurality of pixels can be performed in parallel. This speeds up the image area judging process, thereby increasing the speed of the entire image processing.

Still further, the processing operation using the shading-corrected data for four lines can be performed by utilizing the line data memories for three lines reserved in the SRAM 21. Furthermore, the processing operation using the flags AMCF for three lines can be performed by utilizing the flag memory 37 for two lines reserved in the SRAM 21. Therefore, a large memory capacity is not required for properly processing the character image, gray-scale image and dotted image.

Next, a second embodiment of the present invention will be hereinafter described with reference to FIGS. 8 to 12. Reference is also made again to FIGS. 1 to 5. The following description relates to a processing operation for generating a flag AMCF indicative of which image area among the character image area, gray-scale image area and dotted image area the pixel C7 located in the 7th column on the line C belongs to.

At the time when the image area judging process for the pixel C7 is performed, the shading-corrected data of a pixel A15 on the line A is input to the data generating section 31 for image area judgement from the shading correction circuit 4. At this time, the quadratic differential value S(B14) for the pixel B14 is calculated from the following equation (19) by using the shading-corrected data of pixels in a window W22 of a 3×3 pixel matrix having the pixel B14 in the center thereof.

$$S(B14)=2(B14-AV)+R1+R2-1 \tag{19}$$

$$AV=(A13+A15+C13+C15)/4 \tag{20}$$

R1 and R2 in the above equation (19) take the following values, depending on the remainder obtained through the division of the above equation (20).

Remainder=0 R1=1, R2=1
Remainder=1 R1=0, R2=1
Remainder=2 R1=1, R2=0
Remainder=3 R1=0, R2=0

The quadratic differential value S obtained from the above equation (19) is equivalent to that obtained from the aforesaid equation (2), as can be understood from the following modification of the equation (19).

$$\begin{aligned} S(B14) &= 2(B14-AV)+R1+R2-1 \\ &= (2/4)\{4B14-(A13+A15+C13+C15)\} \\ &= (2/4)\{(B14-A13)+(B14-A15)+ \\ &\quad (B14-C13)+(B14-C15)\} \end{aligned}$$

The shading-corrected data of the pixels A13, C13 and C15 are retained in the shift register (not shown) incorporated in the data generating section 31 for image area judgement (see FIG. 5) as they are or, alternatively, as the sum of the data of each two of the pixels.

Figure 8:
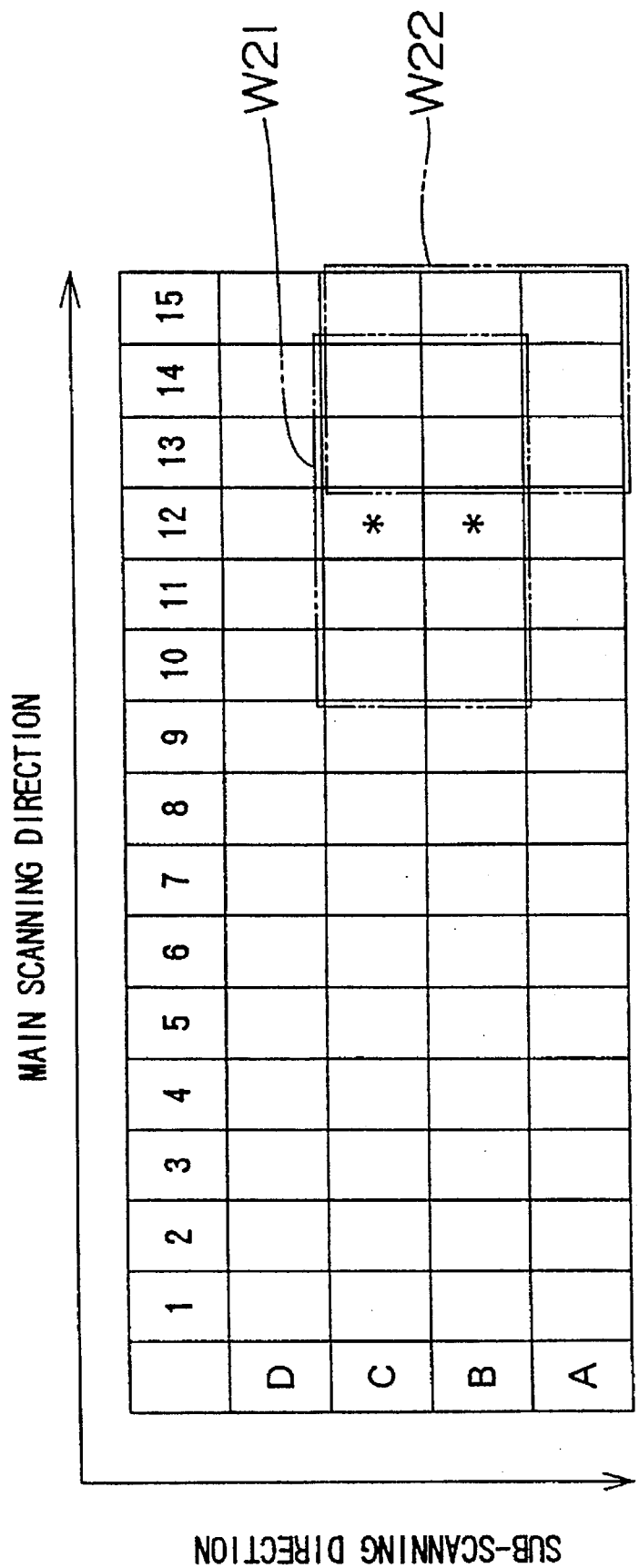
FIG. 8 is a diagram for explaining processing operations performed in a first image area judging section in accordance with a second embodiment of the present invention.

By using the quadratic differential values S of ten pixels C10 to C14 and B10 to B14 in a window W21, the square values SS(C12) of the quadratic differential value of the pixel C12 and the square sum ΣSS(B12) for the pixel B12 are calculated (the pixels C12 and B12 are indicated by asterisk characters (*) in FIG. 8). As can be supposed therefrom, a shift register (not shown) for retaining the quadratic differential values S calculated for the respective pixels in the window W21 is incorporated in the data generating section 31 for image area judgement.

The square value SS(B12) of the quadratic differential value S(B12) for the pixel B12 and the square sum ΣSS (B12) for the five continuous pixels are calculated from the following equations (21) and (22).

$$SS(B12)=S(B12)\times S(B12) \tag{21}$$

$$\Sigma SS(B12)=SS(B10)+SS(B11)+SS(B12)+SS(B13)+SS(B14) \tag{22}$$

The square value SS(C12) and square sum ΣSS(C12) for the pixel C12 are calculated in the same manner as for the pixel B12.

Using the aforesaid square value SS and square sum ΣSS, the first image area judging section 41 generates different flags SSF depending on the conditions shown below:

(1) If ΣSS(B12)<SSC, the flag SSF is set to SSF=01 (corresponding to the gray-scale image area). This processing operation corresponds to that of the step n2 shown in FIG. 3.

(2) If ΣSS(B12)>SSA, the flag SSF is set to SSF=11 (corresponding to the dotted image area). This processing operation corresponds to that of the step n3 shown in FIG. 3.

(3) If SSC≦ΣSS(B12)≦SSA, SS(B10)>BEDGEH, SS(B11)>BEDGEH, SS(B12)>BEDGEH, SS(B13)>BEDGEH and SS(B14)>BEDGEH, the flag SSF is set to SSF=10 (corresponding to the character image area). This processing operation corresponds to that of the step n4 shown in FIG. 3.

(4) In a case other than the above cases (1) to (3) and if ΣSS(B12)>SSAM, the flag SSF is set to SSF=11. This processing operation corresponds to that of the step n5 shown in FIG. 3.

(5) In a case other than the above cases (1) to (4) and if SS(B12)>BEDGE, the flag SSF is set to SSF=10. This processing operation corresponds to the YES-branching process of the step n6 shown in FIG. 3.

(6) In a case other than the above cases (1) to (5), the flag SSF is set to SSF=00. This processing operation corresponds to the NO-branching process of the step n6 shown in FIG. 3.

The processing operation for the pixel C12 is substantially the same as that for the pixel B12.

Figure 9:
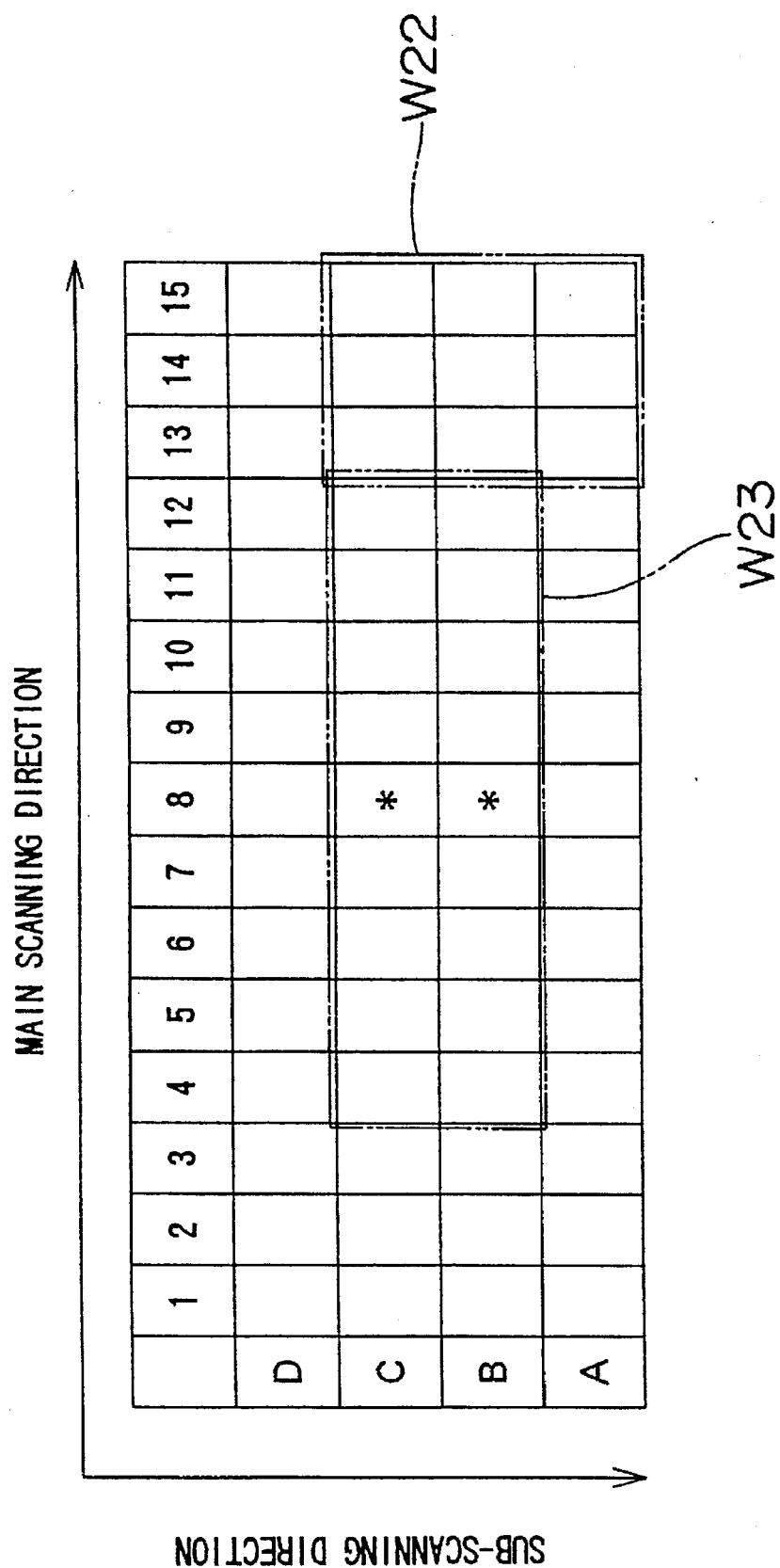
FIG. 9 is a diagram for explaining processing operations performed in a second image area judging section.

FIG. 9 is a diagram for explaining a processing operation performed in the second image area judging section 42, which illustrates a processing operation for generating a flag AMCF by using the flags SSF. In this explanation, flags AMCF are generated for the pixels C8 and B8 indicated by asterisk characters (*) in FIG. 9.

The second image area judging section 42 refers to the flags SSF of nine continuous pixels aligning with the pixel B8 being centered and of nine continuous pixels aligning with the pixel C8 being centered in a window 23 to generate the flags AMCF for the pixels B8 and C8. A shift register (not shown) for retaining the flags SSF of the pixels B4 to B12 and C4 to C12 is incorporated in the second image area judging section 42. The image area judging process for the pixel B8 is as follows:

(1) If the values of the flags SSF(B4) to SSF(B12) are all "11", the flag AMCF is set to AMCF=11 corresponding to the dotted image area. (This processing operation corresponds to the YES-branching process of the step n7 shown in FIG. 3.)

(2) If SSF(B8)=01, the flag AMCF is set to AMCF=01 corresponding to the gray-scale image area.

(3) If SSF(B8)=10, the flag AMCF is set to AMCF=10 corresponding to the character image area.

(4) In a case other than the above cases (1) to (3), the flag AMCF is set to AMCF=00 corresponding to indeterminate image area. (This processing operation corresponds to the NO-branching process of the step n7 shown in FIG. 3.)

Figure 10:
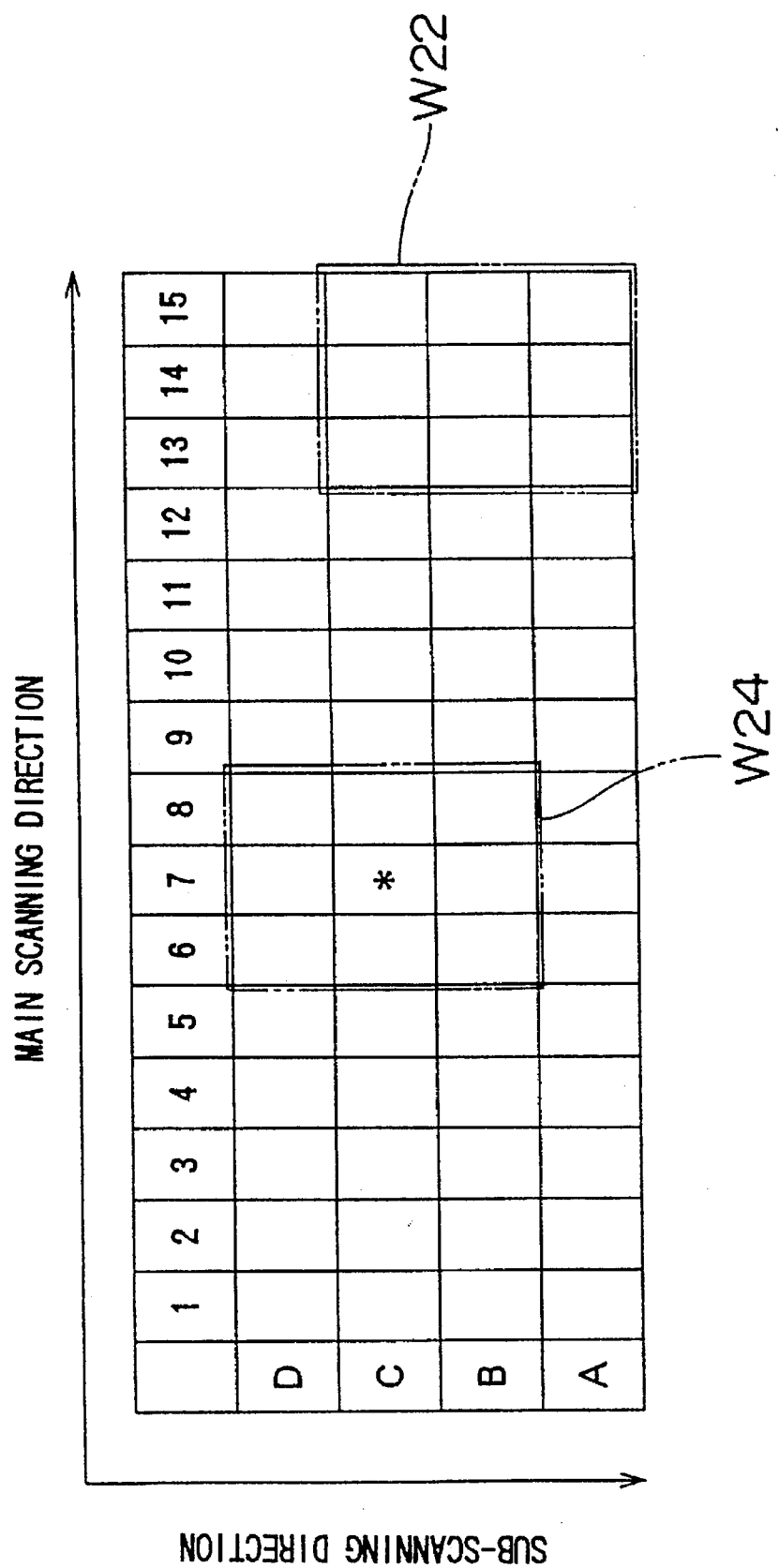
FIG. 10 is a diagram for explaining processing operations performed in a third image area judging section.

FIG. 10 is a diagram for explaining a processing operation performed in the third image area judging section 43 for generating a flag AMCF by using the threshold value BEDGE. The third image area judging section 43 generates a flag AMCF for the pixel C7 indicated by an asterisk character (*) in FIG. 10. At this time, the third image area judging section 43 refers to the square values SS of respective pixels in a 3×3 pixel matrix having the pixel C7 in the center thereof in a window W24. A shift register (not shown) capable of retaining the result of comparison between the threshold value BEDGE and each of the square values SS of the pixels in the 3×3 pixel matrix is incorporated in the third image area judging section 43.

The flag AMCF for the pixel C7 is generated in accordance with the following processing operation. This processing operation is performed for the pixel assigned a flag of AMCF=00 through the process in the second image area judging section 42.

(1) If SS(D6)>BEDGE, SS(C7)>BEDGE and SS(B8)>BEDGE; if SS(C6)>BEDGE, SS(C7)>BEDGE and SS(C8)>BEDGE; if SS(B6)>BEDGE, SS(C7)>BEDGE and SS(D8)>BEDGE; or if SS(D7)>BEDGE, SS(C7)>BEDGE and SS(B7)>BEDGE, the flag AMCF is set to AMCF=10 (corresponding to the character image area). This processing operation corresponds to the YES-branching process of the step n8 shown in FIG. 3.

(2) If the above condition (1) is not satisfied, the flag AMCF is set to AMCF=00 (corresponding to indeterminate image area). This processing operation corresponds to the NO-branching process of the step n8 shown in FIG. 3.

FIG. 11 is a diagram for explaining a process performed in the filtering process judging section 35 for judging whether or not a differential filtering process should be performed. The Laplacian filtering process is performed in the differential filter 6 by using the Shading-corrected data of pixels in a 3×3 pixel matrix with the pixel C7 being centered in a window W25.

The filtering process judging section 35 refers to the flags AMCF of the pixels in the window W25 to judge whether or not the Laplacian filtering process should be carried out. The flags AMCF of pixels D1 to D8 (in a window W26) are read out of the flag memory 37 and retained in a shift register (not shown) incorporated in the filtering process judging section 35. The flags AMCF of eight pixels C1 to C8 (in a window W27) and pixels B6 to B8 are also retained in this shift register. Based on these flags AMCF, the filtering process judging section 35 performs the following processing operation:

(1) If at least one of the pixels in the window W25 belongs to the dotted image area (or has a flag value of AMCF=11), the Laplacian filtering process is not carried out. That is, when the flag value of the pixel C7 is AMCF=10 (corresponding to the character image area), the filtering process judging section 35 generates a selection signal for allowing the selector circuit 9 to select the output of the pass-through circuit 8.

(2) If the pixels C6, C8, and B6 to B8 (or pixels D6 to D8, C6, C8, and B6 to B8) all belong to the gray-scale image area (or have a flag value of AMCF=01), no filtering process is carried out. That is, when the flag value of the pixel C7 is AMCF=10, the filtering process judging section 35 generates a selection signal for allowing the selector circuit 9 to select the output of the pass-through circuit 8, similarly to the above case (1).

(3) In a case other than the above cases (1) and (2) and if the flag value of the pixel C7 is AMCF=10, the filtering process judging section 35 generates a selection signal for allowing the selector circuit 9 to select the output of the differential filter 6. That is, the Laplacian filtering process becomes effective.

FIG. 12 is a diagram for explaining a process for judging whether or not an integrating filtering process should be performed. The integrating filtering process for the pixel C7 is carried out, based on the flags AMCF of pixels C7, C8, B7 and B8 in a 2×2 pixel matrix in a window 28. More specifically, the filtering process judging section 35 performs the following processing operation:

(1) If two or more pixels including the object pixel C7 in the window W28 belong to the dotted image area, the filtering process is carried out. That is, if the flag value of the pixel C7 is AMCF=11 (corresponding to the dotted image area), the filtering process judging section 35 generates a selection signal for allowing the selector circuit 9 to select the output of the integrating filter 7.

(2) In a case other than the above case (1), no filtering process is carried out. That is, if the flag value of the pixel C7 is AMCF=11, the filtering process judging section 35 generates a selection signal for allowing the selector circuit 9 to select the output of the pass-through circuit 8.

After the same processing operation as the above is carried out for the pixel C9, the flags AMCF of the eight pixels in the window W27 (see FIG. 11) are stored in the flag memory 37.

Thus, this embodiment provides substantially the same function and effect as the first embodiment.

As can be understood from the foregoing, the square of a density variation value is employed as a first determination value and the sum of first determination values is employed as a second determination value in accordance with the present invention. Accordingly, these determination values take only a positive value, and the threshold values for these determination values are set only in a positive range. Therefore, the image processing method and the arrangement thereof can be simplified.

Further, in addition to the local state of the object pixel judged on the basis of the first determination value, the states of the peripheral pixels around the object pixel are taken into consideration for judging the image area of the object pixel by employing the second determination value which reflects the states of the peripheral pixels. This allows for the detection of constituent pixels in the dotted image area which cannot be detected by a conventional method. Thus, a correct judgement can be made on which image area among the character image area, gray-scale image area and dotted image area the object pixel is included in. Therefore, any image area can be properly processed by performing a suitable image processing operation in accordance with the image area judgement.

Still further, in accordance with the present invention, since reference is made to the result of the image area judgement for peripheral pixels having predetermined positional relations with respect to the object pixel, the object pixel can be suitably processed in accordance with the states of the peripheral pixels.

Yet further, in accordance with the present invention, the first, second and third processing operations for pixels in the character image area, gray-scale image area and dotted image area are carried out in parallel with the image area judging process. Then, based on the result of the image area judgement, the data subjected to any one of the aforesaid first, second and third processing operations is selectively output. Therefore, the respective pixels can be properly processed in accordance with their image area types at a very high speed.

Still further, in accordance with the present invention, the storage capacity of the storage means required for storing density data can be reduced by retaining in the data retaining means the data necessary for the processing operations performed in the image area judging means and first, second and third processing means.

Yet further, in accordance with the present invention, the processing operations requiring the data of pixels belonging to N (integer) lines can be realized by utilizing a storage means having a storage capacity for (N−1) lines. Therefore, the storage capacity of the storage means required for the processing operations can be reduced.

Still further, in accordance with the present invention, the object pixel can be properly processed in consideration of the states of peripheral pixels around the object pixel.

Yet further, in accordance with the present invention, since a newly generated flag is written in a storage position from which a previous flag has been read out, flags for M (integer) lines can be stored by using a flag storage means capable of storing flags for (M−1) lines. Therefore, the flag storage means requires a less storage capacity.

While the present invention has been particularly shown and described by way of the embodiments, it should be understood that the present invention is not limited to the specifics described in the embodiments. For instance, though the foregoing embodiments have taken an example of a facsimile apparatus, the present invention can be widely applied to such apparatuses as an image scanner and digital copying apparatus which are adapted to process image data obtained through optical image reading. It should be also understood that a variety of design modifications can be made without departing from the spirit and scope of the present invention, as defined in the attached claims.

We claim:

1. An image processing method for processing an image including a plurality of pixels each having density data, comprising the steps of:

calculating a density variation value indicative of density variation around an object pixel based on differences in density data between the object pixel and respective peripheral pixels;

obtaining a first determination value by calculating a square of the density variation value;

calculating a second determination value by adding up first determination values of respective peripheral pixels having predetermined positional relationship with respect to the object pixel;

comparing said first determination value and second determination value with respective predetermined threshold values;

judging which image among a character image, gray-scale image and dotted image the object pixel is included in, based on a comparison result obtained in the comparing step; and processing the object pixel by performing a predetermined processing operation in accordance with a judgement result obtained in the judging step.

2. An image processing method as set forth in claim 1, wherein said processing step includes the sub-step of determining the type of processing operation to be performed for the object pixel, based on the judgment result obtained in the judging step for the object pixel as well as judgement results obtained in the judging step for the peripheral pixels having predetermined positional relationship with respect to the object pixel.

3. An image processing apparatus for processing an image including a plurality of pixels each having density data, comprising:

means for calculating a density variation value indicative of density variation around an object pixel, based on differences in density data between the object pixel and respective peripheral pixels;

means for calculating a square of the density variation value to obtain a first determination value;

means for adding up first determination values of respective peripheral pixels having predetermined positional relationship with respect to the object pixel to calculate a second determination value;

a comparing means for comparing said first determination value and second determination value with respective predetermined threshold values;

a judging means for judging which image among a character image, gray-scale image and dotted image the object pixel is included in, based on a comparison result obtained by the comparing means; and a processing means for performing a predetermined processing operation for the object pixel in accordance with a judgment result obtained by the judging means.

4. An image processing apparatus as set forth in claim 3, wherein said processing means comprises means for determining the type of processing operation to be performed for the object pixel, based on the judgement result obtained by the judging means for the object pixel as well as judgement results obtained by the judging means for the peripheral pixels having predetermined positional relationship with respect to the object pixel.

* * * * *